US008780855B2

(12) United States Patent
Ohta et al.

(10) Patent No.: US 8,780,855 B2
(45) Date of Patent: Jul. 15, 2014

(54) RADIO COMMUNICATION APPARATUS, RADIO COMMUNICATION SYSTEM, AND RADIO COMMUNICATION METHOD

(75) Inventors: Yoshiaki Ohta, Yokohama (JP); Yoshihiro Kawasaki, Yokosuka (JP); Tetsuya Yano, Yokohama (JP); Yoshinori Tanaka, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 198 days.

(21) Appl. No.: 13/567,500

(22) Filed: Aug. 6, 2012

(65) Prior Publication Data

US 2013/0195071 A1    Aug. 1, 2013

Related U.S. Application Data

(63) Continuation of application No. PCT/JP2010/052103, filed on Feb. 12, 2010.

(51) Int. Cl.
    *H04W 4/00* (2009.01)
(52) U.S. Cl.
    USPC .......................................... 370/330; 370/328
(58) Field of Classification Search
    USPC ................................................. 370/328, 330
    See application file for complete search history.

(56) References Cited

U.S. PATENT DOCUMENTS

| 8,285,294 | B2 * | 10/2012 | Baldemair et al. ............ 455/450 |
| 8,504,099 | B2 * | 8/2013 | Corson et al. ............... 455/552.1 |
| 2006/0084404 | A1 * | 4/2006 | Laroia et al. ................. 455/266 |
| 2007/0099669 | A1 * | 5/2007 | Sadri et al. ................. 455/562.1 |
| 2007/0206531 | A1 * | 9/2007 | Pajukoski et al. ............. 370/329 |
| 2008/0130486 | A1 * | 6/2008 | Lim et al. ..................... 370/210 |
| 2008/0285490 | A1 * | 11/2008 | Mukai et al. ................. 370/280 |
| 2009/0219873 | A1 * | 9/2009 | Higuchi et al. ............... 370/329 |
| 2010/0048144 | A1 * | 2/2010 | Fukami et al. ................. 455/68 |
| 2012/0172048 | A1 | 7/2012 | Kato et al. |

FOREIGN PATENT DOCUMENTS

JP    2011-035860    2/2011

OTHER PUBLICATIONS

Fujitsu; "On RACH selection freedom"; Agenda Item: 7.1.1.8; Apr. 12-16, 2010; 3GPP TSG-RAN WG2 Meeting #69bis; R2-102163; Beijing, China.
Office Action issued for corresponding Japanese Patent Application No. 2011-553696, issued on Sep. 17, 2013, with English translation.
3rd Generation Partnership Project; Technical Specification Group Radio Access Network; "Requirements for further advancements for Evolved Universal Terrestrial Radio Access (E-UTRA)"; (LTE-Advanced); (Release 8); 3GPP TR 36.913 V8.0.1; Mar. 2009.
3rd Generation Partnership Project; Technical Specification Group Radio Access Network; "Feasibility study for Further Advancements for E-UTRA"; (LTE-Advanced); (Release 9); 3GPP TR 36.912 V9.0.0; Sep. 2009.

(Continued)

*Primary Examiner* — Kenny Lin
(74) *Attorney, Agent, or Firm* — Myers Wolin, LLC

(57) ABSTRACT

Radio communication apparatus perform communication by using a plurality of frequency bands. The radio communication apparatus transmits to the radio communication apparatus by using a first frequency band a control message including identification information indicating a second frequency band different from the first frequency band during a random access procedure. The radio communication apparatus receives the control message from the radio communication apparatus by using the first frequency band and performs data communication by using the second frequency band indicated by the identification information included in the control message.

9 Claims, 31 Drawing Sheets

(56) References Cited

OTHER PUBLICATIONS

Samsung; "The need for additional activation procedure in carrier aggregation"; Agenda Item: 7.3.4; 3GPP TSG-RAN2 #67bis meeting; R2-095874; Miyazaki, Japan; Oct. 12-16, 2009.

3rd Generation Partnership Project; Technical Specification Group Radio Access Network; "Evolved Universal Terrestrial Radio Access (E-UTRA) and Evolved Universal Terrestrial Radio Access Network (E-UTRAN)"; Overall description; Stage 2 (Release 9); 3GPP TS 36.300 V9.0.0; Jun. 2009.

3rd Generation Partnership Project; Technical Specification Group Radio Access Network; "Evolved Universal Terrestrial Radio Access (E-UTRA) Medium Access Control (MAC) protocol specification"; (Release 9); 3GPP TS 36.321 V9.1.0; Dec. 2009.

3rd Generation Partnership Project; Technical Specification Group Radio Access Network; Evolved Universal Terrestrial Radio Access (E-UTRA); Multiplexing and channel coding (Release 9); 3GPP TS 36.212 V9.0.0; Dec. 2009.

3rd Generation Partnership Project; Technical Specification Group Radio Access Network; "Evolved Universal Terrestrial Radio Access (E-UTRA)"; Physical layer procedures (Release 9); 3GPP TS 36.213 V9.0.1; Dec. 2009.

Ericsson, ST Ericsson; "Random access with carrier aggregation"; Agenda Item: 07.1.8; 3GPP TSG-RAN WG2 #68bis; R2-100429; Valencia, Spain; Jan. 18-22, 2010.

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9); 3GPP TS 36.300 V9.2.0 (pp. 49-51, 56-60); Dec. 2009.

3rd Generation Partnership Project; Technical Specification Group Radio Access Network; Evolved Universal Terrestrial Radio Access (E-UTRA) Radio Resource Control (RRC); Protocol specification (Release 9); 3GPP TS 36.331 V9.1.0 (pp. 40-44); Dec. 2009.

Nokia Corporation, Nokia Siemens Networks; "RACH and carrier aggregation"; Agenda Item: 7.1.8; 3GPP TSG-RAN WG2 Meeting #68bis; R2-100372; Valencia, Spain; Jan. 18-22, 2010.

International Search Report issued for corresponding International Patent Application No. PCT/JP2010/052103 with English translation mailed Apr. 20, 2010.

\* cited by examiner

| DL bandwidth (RBs) | 6 RBs | 15 RBs | 25 RBs | 50 RBs | 75 RBs | 100 RBs |
|---|---|---|---|---|---|---|
| Flag | 1 bit (1) | 1 bit (1) | 1 bit (1) | 1 bit (1) | 1 bit (1) | 1 bit (1) |
| Local/Dist | 1 bit (0) | 1 bit (0) | 1 bit (0) | 1 bit (0) | 1 bit (0) | 1 bit (0) |
| Resource Block Assignment | 5 bit (111⋯) | 7 bit (111⋯) | 9 bit (111⋯) | 11 bit (111⋯) | 12 bit (111⋯) | 13 bit (111⋯) |
| Preamble Index | 6 bit | 6 bit | 6 bit | 6 bit | 6 bit | 6 bit |
| PRACH Mask Index | 4 bit | 4 bit | 4 bit | 4 bit | 4 bit | 4 bit |
| Carrier Indicator | 3 bit | 3 bit | 3 bit | 3 bit | 3 bit | 3 bit |
| CRC | 16 bit | 16 bit | 16 bit | 16 bit | 16 bit | 16 bit |

FIG. 13

| DL bandwidth (RBs) | 6 RBs | 15 RBs | 25 RBs | 50 RBs | 75 RBs | 100 RBs |
|---|---|---|---|---|---|---|
| Flag | 1 bit (1) | 1 bit (1) | 1 bit (1) | 1 bit (1) | 1 bit (1) | 1 bit (1) |
| Local/Dist | 1 bit (0) | 1 bit (0) | 1 bit (0) | 1 bit (0) | 1 bit (0) | 1 bit (0) |
| Carrier Indicator | 3 bit | 3 bit | 3 bit | 3 bit | 3 bit | 3 bit |
| Resource Block Assignment | 2 bit (111···) | 4 bit (111···) | 6 bit (111···) | 8 bit (111···) | 9 bit (111···) | 10 bit (111···) |
| Preamble Index | 6 bit | 6 bit | 6 bit | 6 bit | 6 bit | 6 bit |
| PRACH Mask Index | 4 bit | 4 bit | 4 bit | 4 bit | 4 bit | 4 bit |
| Padding | 3 bit (111) | 3 bit (111) | 3 bit (111) | 3 bit (111) | 3 bit (111) | 3 bit (111) |
| CRC | 16 bit | 16 bit | 16 bit | 16 bit | 16 bit | 16 bit |

FIG. 14

| DL bandwidth (RBs) | 6 RBs | 15 RBs | 25 RBs | 50 RBs | 75 RBs | 100 RBs |
|---|---|---|---|---|---|---|
| Flag | 1 bit (1) | 1 bit (1) | 1 bit (1) | 1 bit (1) | 1 bit (1) | 1 bit (1) |
| Local/Dist | 1 bit (0) | 1 bit (0) | 1 bit (0) | 1 bit (0) | 1 bit (0) | 1 bit (0) |
| Resource Block Assignment | 2 bit (111⋯) | 4 bit (111⋯) | 6 bit (111⋯) | 8 bit (111⋯) | 9 bit (111⋯) | 10 bit (111⋯) |
| Carrier Indicator | 3 bit | 3 bit | 3 bit | 3 bit | 3 bit | 3 bit |
| Preamble Index | 6 bit | 6 bit | 6 bit | 6 bit | 6 bit | 6 bit |
| PRACH Mask Index | 4 bit | 4 bit | 4 bit | 4 bit | 4 bit | 4 bit |
| Padding | 3 bit (111) | 3 bit (111) | 3 bit (111) | 3 bit (111) | 3 bit (111) | 3 bit (111) |
| CRC | 16 bit | 16 bit | 16 bit | 16 bit | 16 bit | 16 bit |

FIG. 15

| 6 RBs | 15 RBs | 25 RBs | 50 RBs | 75 RBs | 100 RBs |
|---|---|---|---|---|---|
| Flag | Flag | Flag | Flag | Flag | Flag |
| L/D | L/D | L/D | L/D | L/D | L/D |
| CI | CI | CI | CI | CI | CI |
| RBA | RBA | RBA | RBA | RBA | RBA |
| PAD | PAD | PAD | PAD | PAD | PAD |
| PID | PID | PID | PID | PID | PID |
| Mask | Mask | Mask | Mask | Mask | Mask |
| Pad | Pad | Pad | Pad | Pad | Pad |
| CRC | CRC | CRC | CRC | CRC | CRC |

FIG. 17

| 6 RBs | 15 RBs | 25 RBs | 50 RBs | 75 RBs | 100 RBs |
|---|---|---|---|---|---|
| Flag | Flag | Flag | Flag | Flag | Flag |
| L/D | L/D | L/D | L/D | L/D | L/D |
| PAD | PAD | PAD | PAD | PAD | PAD |
| RBA | RBA | RBA | RBA | RBA | RBA |
| CI | CI | CI | CI | CI | CI |
| PID | PID | PID | PID | PID | PID |
| Mask | Mask | Mask | Mask | Mask | Mask |
| Pad | Pad | Pad | Pad | Pad | Pad |
| CRC | CRC | CRC | CRC | CRC | CRC |

FIG. 18

| 0 | 1 | 2 | 3 | 4 | 5 | 6 | 7 | bit |
|---|---|---|---|---|---|---|---|---|

| R = 1 | Carrier Indicator | | | R | R | Timing Advance Command | |
|---|---|---|---|---|---|---|---|
| Timing Advance Command | | | | UL grant | | | |
| UL grant | | | | | | | |
| UL grant | | | | | | | |
| Temporary C-RNTI | | | | | | | |
| Temporary C-RNTI | | | | | | | |

FIG. 24

RADIO COMMUNICATION APPARATUS, RADIO COMMUNICATION SYSTEM, AND RADIO COMMUNICATION METHOD

CROSS-REFERENCE TO RELATED APPLICATION

This application is a continuation application of International Application PCT/JP2010/052103, filed on Feb. 12, 2010 and designated the U.S., the entire contents of which are incorporated herein by reference.

FIELD

The embodiment discussed herein is related to a radio communication apparatus, a radio communication system, and a radio communication method.

BACKGROUND

A plurality of radio communication systems such as a cell-phone system and a radio MAN (Metropolitan Area Network) are currently used. For attaining a further speeding up and large capacity of radio communication, lively discussion is continuously performed about a next generation radio communication technology.

For example, in a 3GPP (3rd Generation Partnership Project) being a standardization organization, there is proposed a communication standard referred to as an LTE (Long Term Evolution) enabling communication using a frequency band of 20 MHz at a maximum. Further, as a next generation communication standard of LTE, there is proposed a communication standard referred to as an LTE-A (LTE-Advanced) enabling communication using five frequency bands (namely, a frequency band of 100 MHz) of 20 MHz at a maximum (see, for example, Non-Patent Literatures 1 and 2). In the LTE-A, the number of frequency bands to be used is proposed to be dynamically changed according to traffic (see, for example, Non-Patent Literature 3).

Further, in a radio communication system, from one radio communication device (e.g., a mobile station) to another radio communication device (e.g., a base station) which performs allocation control of radio resources, a random access may be performed. The random access from the mobile station to the base station is performed, for example, at the time when (1) the mobile station first accesses the base station, (2) an allocation of radio resources used for data transmission is requested to the base station, and (3) synchronization is established during reception of data from the base station, and (4) synchronization is achieved with a mobile target base station during a handover.

The random access includes a contention based random access and a non-contention based random access (see, for example, 10. 1. 5 section of Non-Patent Literature 4, and 5. 1 section of Non-Patent Literature 5). In the case of the random access from the mobile station to the base station, in the contention based random access, the mobile station arbitrarily selects a signal sequence from among a plurality of signal sequences and transmits it to the base station as a random access preamble. In the non-contention based random access, the base station notifies the mobile station of information in which a signal sequence is specified and the mobile station transmits a signal sequence according to the notification from the base station as the random access preamble.

NPTL1: 3GPP (3rd Generation Partnership Project), "Requirements for further advancements for Evolved Universal Terrestrial Radio Access (E-UTRA) (LTE-Advanced)", 3GPP TR 36.913 V8.0.1, 2009-03.

NPTL2: 3GPP (3rd Generation Partnership Project), "Feasibility study for Further Advancements for E-UTRA (LTE-Advanced)", 3GPP TR 36.912 V9.0.0, 2009-09.

NPTL3: 3GPP (3rd Generation Partnership Project), "The need for additional activation procedure in carrier aggregation", 3GPP TSG-RAN WG2 #67bis R2-095874, 2009-10.

NPTL4: 3GPP (3rd Generation Partnership Project), "Evolved Universal Terrestrial Radio Access (E-UTRA) and Evolved Universal Terrestrial Radio Access Network (E-UTRAN); Overall description", 3GPP TS 36.300 V9.0.0, 2009-06.

NPTL5: 3GPP (3rd Generation Partnership Project), "Evolved Universal Terrestrial Radio Access (E-UTRA) Medium Access Control (MAC) protocol specification", 3GPP TS 36.321 V9.1.0, 2009-12.

Incidentally, in a radio communication system capable of performing communication by using a plurality of frequency bands, the number of frequency bands to be used according to traffic as described above is considered to be changed. However, in a method as described in the Non-Patent Literature 3, after communication is started between radio communication devices (after completing a random access procedure), a procedure is freshly performed so as to use other frequency bands except the frequency band in which communication is started. In this method, in the case where it is proved that the other frequency bands are desired to be used before starting communication (for example, in the case where a transmission data amount is proved to be large), the procedure becomes inefficient.

SUMMARY

According to an aspect of the embodiments, there is provided a radio communication apparatus to perform communication with another radio communication apparatus by using a plurality of frequency bands. The apparatus includes: a receiving unit configured to receive by using a first frequency band a control message including identification information indicating a second frequency band different from the first frequency band during a random access procedure to said another radio communication apparatus; and a control unit configured to control data communication between said another radio communication apparatus and the radio communication apparatus by using the second frequency band indicated by the identification information included in the control message.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWING

FIG. 13 illustrates a first format example of a Msg0, FIG. 14 illustrates a second format example of a Msg0, FIG. 15 illustrates a third format example of a Msg0, FIG. 17 illustrates a second size adjustment example of a Msg0, FIG. 18 illustrates a third size adjustment example of a Msg0, FIG. 24 illustrates a first format example of a Msg2.

DESCRIPTION OF EMBODIMENTS

Figure 1:
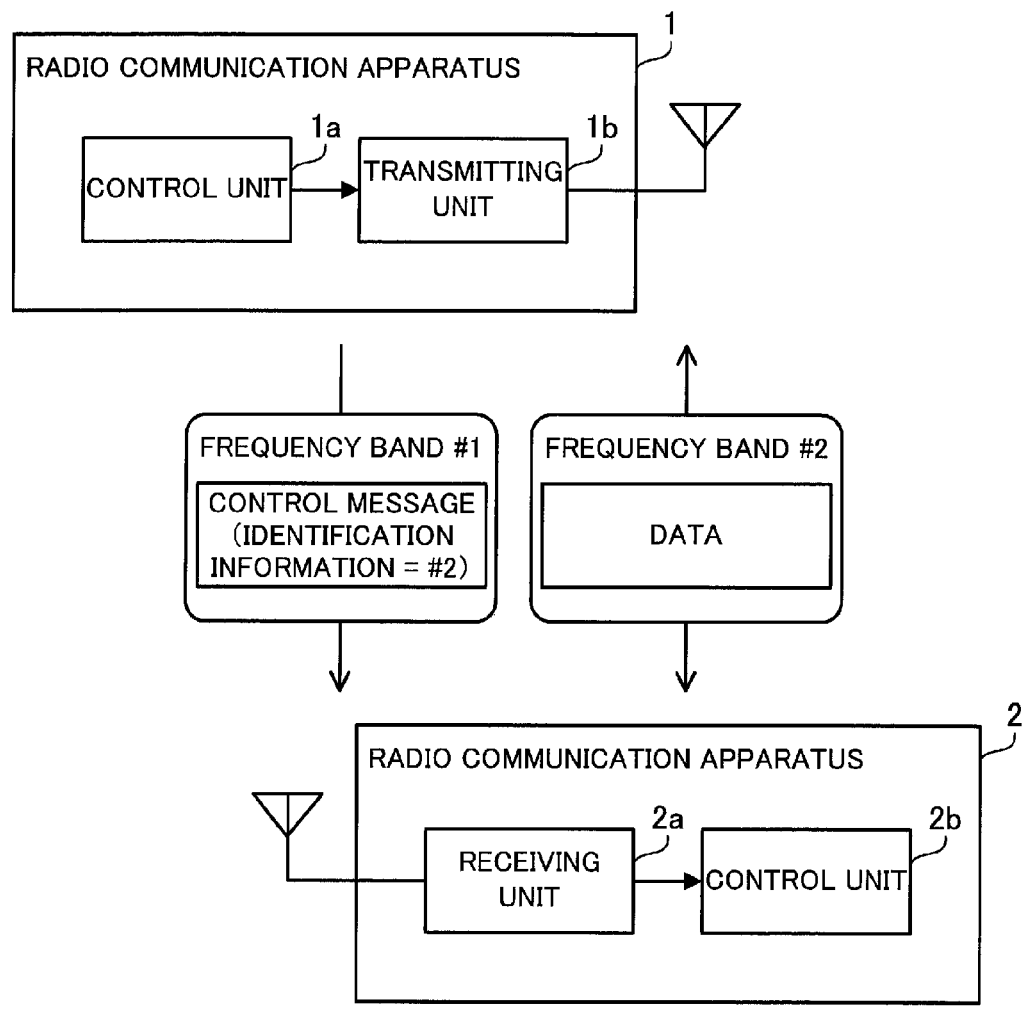
FIG. 1 illustrates a radio communication system according to a first embodiment.

Preferred embodiments of the present invention will now be described in detail below with reference to the accompanying drawings, wherein like reference numerals refer to like elements throughout.

First Embodiment

FIG. 1 illustrates a radio communication system according to a first embodiment. The radio communication system according to the first embodiment includes radio communication apparatus 1 and 2. The radio communication apparatus 1 and 2 perform communication by using a plurality of frequency bands. Such a radio communication system is implemented, for example, as an LTE-A system. In the LTE-A system, the plurality of frequency bands may be each referred to as a CC (Component Carrier).

The radio communication apparatus 1 performs allocation control of radio resources. Under the control of the radio communication apparatus 1, the radio communication apparatus 2 performs data communication between the radio communication apparatus 1 (or, another radio communication apparatus) and its own apparatus. For example, the radio communication apparatus 1 is implemented as a base station or a relay station, and the radio communication apparatus 2 is implemented as a subscriber station. Or, alternatively, the radio communication apparatus 1 may be implemented as a base station, and the radio communication apparatus 2 may be implemented as a relay station. The radio communication apparatus 1 and 2 may be a fixed radio communication apparatus or a mobile radio communication apparatus.

The radio communication apparatus 1 has a control unit 1a and a transmitting unit 1b. The control unit 1a sets a frequency band #1 as a frequency band used for a random access procedure through the radio communication apparatus 2. The control unit 1a further selects a frequency band #2 as a frequency band used for data communication through the radio communication apparatus 2. The transmitting unit 1b transmits a control message relating to the random access to the radio communication apparatus 2 by using the frequency band #1. Into this control message, identification information indicating the frequency band #2 is inserted. The identification information (e.g., a unique number) is previously matched with the plurality of the frequency bands, respectively.

The radio communication apparatus 2 has a receiving unit 2a and a control unit 2b. The receiving unit 2a receives the control message relating to the random access from the radio communication apparatus 1 by using the frequency band #1. The control unit 2b confirms identification information included in the received control message and controls the radio communication apparatus 2 to perform data communication by using the frequency band #2 indicated by the identification information. Examples of the random access target and data communication partner of the radio communication apparatus 1 include the radio communication apparatus 1. Note that in the case of performing a handover from the radio communication apparatus 1 to another radio communication apparatus, the random access target and data communication partner is a radio communication apparatus as a handover target.

As described above, as the random access, the radio communication apparatus 2 performs the non-contention based random access or contention based random access. In the case of the non-contention based random access, for example, a message (Msg0) for specifying a signal sequence of a random access preamble or a random access response (Msg2) as a response for the random access preamble (Msg1) is considered to be used as the control message. In the case of the contention based random access, the random access response is considered to be used as the control message.

When receiving the control message including the identification information by using the frequency band #1, the radio communication apparatus 2 may continue a subsequent random access procedure by using the frequency band #2. In the case where the frequency band #2 is in a de-active state, at the time when receiving the control message including the identification information, the radio communication apparatus 2 may change a state of the frequency band #2 into an active state. On the other hand, at the time when receiving the control message including the identification information, the radio communication apparatus 1 may change a state of the frequency band #2 into an active state. In this case, the radio communication apparatus 1 and 2 need not separately transmit and receive the control message for changing a state of the frequency band #2 into an active state.

In the above-described radio communication system according to the first embodiment, the radio communication apparatus 1 selects the frequency band #2 as a frequency band used for data communication through the radio communication apparatus 2. At the time of performing the random access procedure, by using the frequency band #1, the radio communication apparatus 1 transmits the control message including the identification information indicating the frequency band #2 to the radio communication apparatus 2. On the other hand, at the time of performing the random access procedure, by using the frequency band #1, the radio communication apparatus 2 receives the control message including the identification information indicating the frequency band #2 from the radio communication apparatus 1. The radio communication apparatus 1 then performs data communication by using the frequency band #2 indicated by the identification information.

This process permits the radio communication apparatus 1 to give a permission of the use of the frequency band #2 different from the frequency band #1 used at the time of starting the random access procedure to the radio communication apparatus 2 during the random access procedure. That is, the radio communication apparatus 1 implements cross carrier scheduling during the random access procedure. Accordingly, after the random access procedure, the radio communication apparatus 1 need not separately perform a procedure for giving a permission of the use of the frequency band #2 to the radio communication apparatus 2, and effectively performs the use control of the plurality of the frequency bands.

In the second to fourth embodiments, a case where the radio communication method according to the first embodiment is applied to a mobile communication system of the LTE-A will be further described in detail below. Note that the radio communication method according to the first embodiment is applicable to the mobile communication system using a communication method other than the LTE-A or the fixed radio communication system.

Second Embodiment

Figure 2:
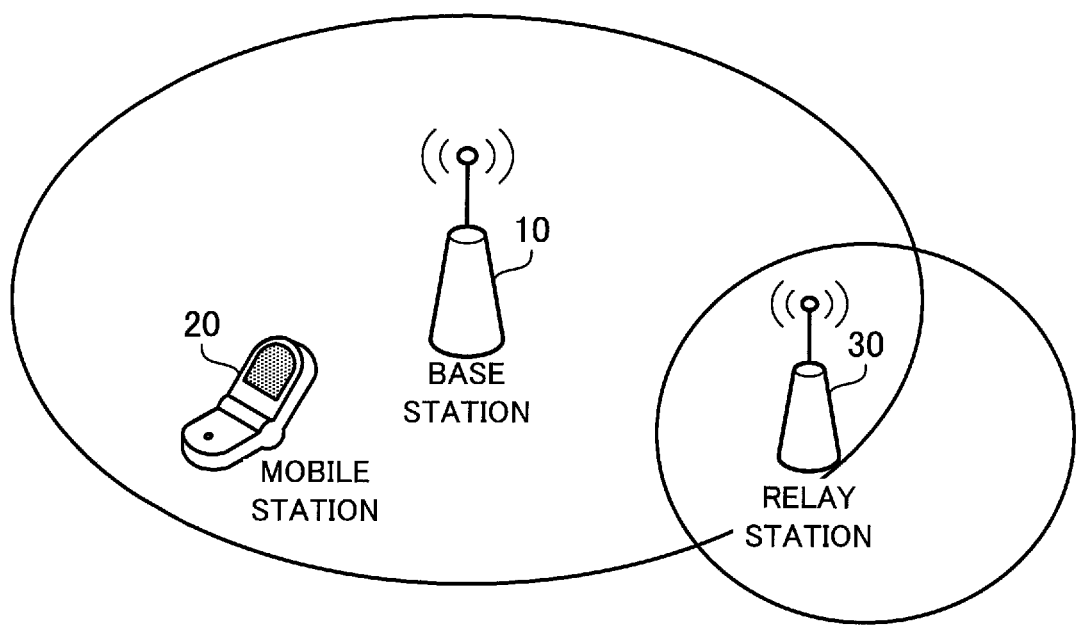
FIG. 2 illustrates a mobile communication system according to a second embodiment.

FIG. 2 illustrates a mobile communication system according to a second embodiment. The mobile communication system according to the second embodiment includes a base station 10, a mobile station 20, and a relay station 30. This mobile communication system allows radio communication using five component carriers at a maximum.

The base station 10 is a radio communication apparatus which performs communication directly with the mobile station 20 or via the relay station 30. The base station 10 is connected to a host station (not illustrated) by wire, and transfers user data between a wired section and a radio section. The base station 10 manages radio resources of a link between the base station 10 and the mobile station 20, and further radio resources of a link between the base station 10 and the relay station 30.

The mobile station 20 is a radio terminal device which accesses the base station 10 or the relay station 30 and performs radio communication. As the mobile station 20, for example, a mobile phone handset device or portable information terminal device is used. The mobile station 20 performs random access and establishes synchronization to the base station 10 or the relay station 30, and then transmits and receives data.

The relay station 30 is a radio communication device which relays data transmission between the base station 10 and the mobile station 20. The relay station 30 may be a fixed communication device or a mobile communication device. The relay station 30 may perform random access to the base station 10 and establish synchronization therewith. In addition, the relay station 30 manages radio resources of a link between the relay station 30 and the mobile station 20.

In the following description of the second embodiment, the random access procedure performed between the base station and the mobile station 20 will be described. Even between the base station 10 and the relay station 30 as well as between the relay station 30 and the mobile station 20, the same random access procedure is performed.

Figure 3:
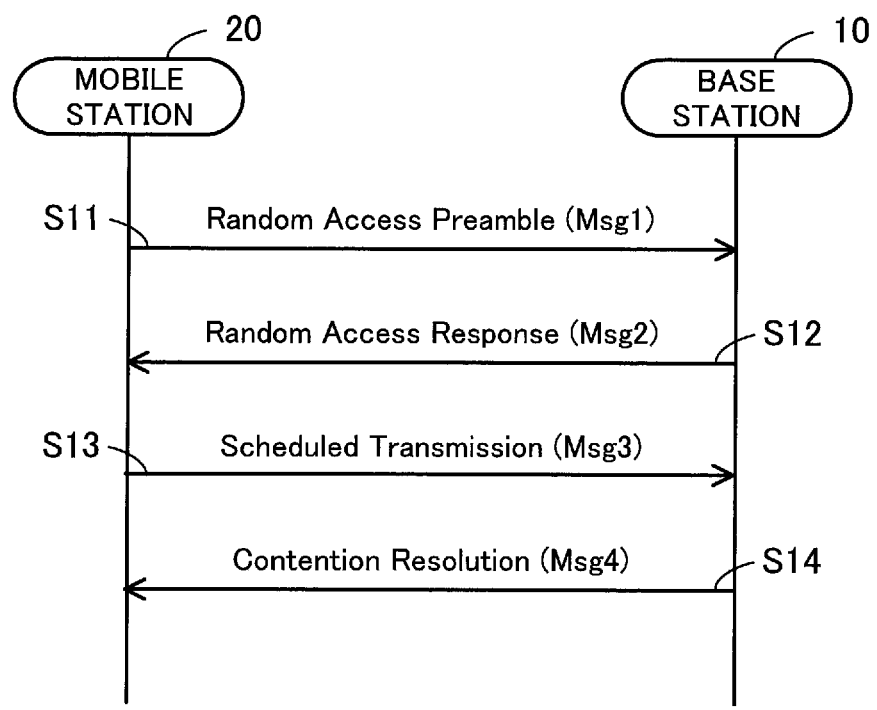
FIG. 3 is a sequence diagram illustrating a contention based random access procedure.

FIG. 3 is a sequence diagram illustrating the contention based random access procedure. The following section will now discuss the case where the random access procedure is performed in only one component carrier. The sequence illustrated in FIG. 3 includes the following steps:

(Step S11) When data to be transmitted in an UL (uplink) is generated, the mobile station 20 selects one arbitrary signal sequence from among a plurality of previously defined signal sequences. The mobile station 20 then transmits a random access preamble (Msg1) including the selected signal sequence to the base station 10 by using a PRACH (Physical Random Access Channel). At this time, on the PRACH, a plurality of the mobile stations may transmit the Msg1 of the same signal sequence, namely, contention of the random access may be caused.

(Step S12) When detecting the Msg1 on the PRACH, the base station 10 measures UL transmission timing of the mobile station 20, and at the same time allocates a UL radio resource to the mobile station 20. The base station 10 then transmits the random access response (Msg2) including information for synchronizing the UL timing or information indicating the allocated UL radio resource. In the case where the contention of the random access is caused, the mobile stations which transmit the Msg1 receive the Msg2, respectively.

(Step S13) When receiving the Msg2, the mobile station transmits a scheduled transmission (Msg3) including the identification information of the mobile station 20 to the base station 10 by using the UL radio resource allocated by the base station 10. In the case where the contention of the random access is caused, the mobile stations which transmit the Msg1 (namely, receive the Msg2) transmit an Msg3, respectively. In this case, a plurality of the transmitted Msg3 sets interfere with each other on the same radio resource.

(Step S14) The base station 10 detects the Msg3 on the UL radio resource allocated at step S12. Based on the identification information included in the Msg3, the base station 10 recognizes the mobile station 20 which performs the random access. As a result, the base station 10 transmits a contention resolution (Msg4) indicating that the mobile station is recognized to the mobile station 20. The mobile station 20 then establishes synchronization between the base station 10 and its own station, and allows the data communication.

Note that in the case where the contention of the random access is caused, the identification information of the mobile station as a transmission source fails to be extracted from the Msg3. In this case, the base station 10 transmits a message indicating that the contention of the random access is caused. After waiting for only the random time, the mobile station 20 which receives the message returns to step S11 and performs the random access procedure again. When the contention is eliminated, the mobile station 20 establishes synchronization between the base station 10 and its own station, and allows the data communication.

Figure 4:
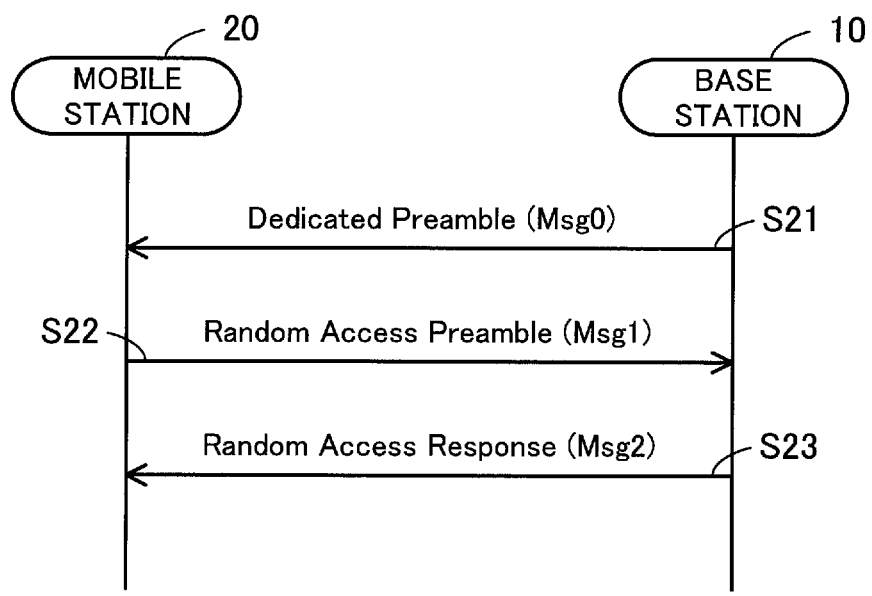
FIG. 4 is a sequence diagram illustrating a non-contention based random access procedure.

FIG. 4 is a sequence diagram illustrating the non-contention based random access procedure. The following section will now discuss the case where the random access procedure is performed in only one component carrier. The sequence illustrated in FIG. 4 includes the following steps:

(Step S21) When data transmitted in the downlink (DL) reaches the base station 10, the base station 10 selects one unused signal sequence from among a plurality of the previously defined signal sequences. The base station 10 then transmits the dedicated preamble notification (Msg0) for specifying the selected signal sequence to the mobile station 20. At this time, the base station 10 performs exclusion control to a plurality of mobile stations so as not to allocate the same signal sequence at the same time.

(Step S22) Within the specified period (period of validity) from receiving the Msg0, the mobile station 20 transmits the Msg1 including the signal sequence specified by the Msg0 to the base station 10 by using the PRACH. Here, since the specified signal sequence is exclusively allocated to the mobile stations 20 within the period of validity, the contention of the random access is not caused.

(Step S23) When detecting the Msg1 on the PRACH, the base station 10 allocates the UL radio resource to the mobile stations 20. The base station 10 then transmits the Msg2 including information indicating the allocated UL radio resource to the mobile station 20. The data communication is then enabled between the base station 10 and the mobile station 20. Since the contention of the random access is not caused, the base station need not transmit and receive the Msg3 and the Msg4 in the non-contention based random access.

The contention based random access is performed, for example, at the time when (1) the mobile station 20 first accesses the base station 10, and at the time when (2) the mobile station 20 requests the allocation of radio resources to the base station 10. The non-contention based random access is performed, for example, (3) when receiving data from the base station 10, at the time when the mobile station 20 establishes synchronization with the base station 10, and (4) when performing handover to the base station 10 from another base station, at the time when the mobile station 20 establishes synchronization with the base station 10.

Note that when the non-contention based random access is to be performed (for example, at the time of establishing synchronization during the handover or when the mobile station receives data from the base station 10) in the case where the separately allocated signal sequence is exhausted in the base station 10, the Msg0 not including a dedicated preamble is transmitted and received. In this case, the contention based random access is performed. In the case of the handover, the base station 10 before the handover transmits the Msg0 to the mobile station 20. According to the second embodiment, the base station 10 and the mobile station 20 are supposed to perform the non-contention based random access procedure.

Figure 5:
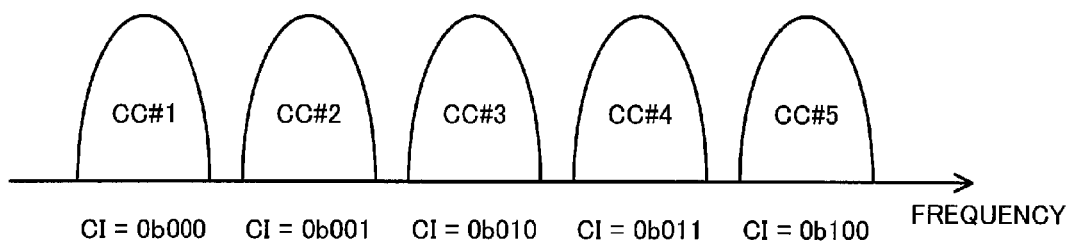
FIG. 5 illustrates a component carrier in which radio communication is performed.

FIG. 5 illustrates a component carrier in which the radio communication is performed. As described above, the base station 10 and the mobile station 20 use five component carriers (CC#1 to #5) at a maximum, thereby performing radio communication. All bandwidths of the CC#1 to #5 may be the same as each other or different from each other.

To the CC#1 to #5, a CI (Carrier Indicator) of 3 bits is given as identification information, respectively. Here, 0b000 (0) indicates the CC#1, 0b001 (1) indicates the CC#2, 0b010 (2) indicates the CC#3, 0b011 (3) indicates the CC#4, and 0b100 (4) indicates the CC#5. Here, 0b101 (5) and 0b110 (6) are unused values (reservation values). As described later, 0b111 (7) may be used for indicating its own component carrier.

The base station 10 sets their states of the CC#1 to #5 in each mobile station. Based on the states of the CC#1 to #5, the mobile station 20 controls radio reception processing of each component carrier. Based on their states, for example, the CC#1 to #5 are classified into "Configured but Deactivated CC", "Configured and Activated CC", and "PDCCH monitoring set".

The "Configured but Deactivated CC" is a component carrier in which the data communication is not currently performed and which is in a usable state (de-active state). In the component carrier in a de-active state, the mobile station need not monitor any of a PDCCH (Physical Downlink Control CHannel) in which control data is transmitted and a PDSCH (Physical Downlink Shared CHannel) in which a data signal is transmitted. Namely, the mobile station 20 may stop the radio reception processing of the frequency band.

The "Configured and Activated CC" is a component carrier (in an active state) in which the data communication is currently performed. By using the component carrier in an active state, the mobile station 20 performs at least radio reception processing relating to the PDSCH to the mobile station 20.

The "PDCCH monitoring set" is in an active state and a set of the component carriers in which the PDCCH to the mobile station 20 may be set. The mobile station 20 monitors the PDCCH by using the component carriers included in this set. In the case where a signal length of the PDCCH is not constant, the mobile station 20 blind-decodes the PDCCH. Specifically, the mobile station 20 tries a plurality of decodes according to a length of available signal, thus extracting control data. Note that the "PDCCH monitoring set" is defined as a subset of the "Configured and Activated CC" and the reception processing of the PDCCH ought to be performed by all of the "Configured and Activated CCs" in some cases. In this case, the "PDCCH monitoring set" and the "Configured and Activated CC" mean the same set.

In addition, a component carrier in which the PDCCH is set may be different in each mobile station. The base station 10 may set a part of the CC#1 to #5 as an ACC (Anchor-Component Carrier). The ACC is a component carrier to be monitored by the mobile station. In the case where the ACC is set, the ACC is included at least in the "PDCCH monitoring set". A component carrier set as the ACC may be specified in each cell, or in each mobile station.

For performing two-way communication, the base station and the mobile station 20 may use TDD (Time Division Duplex) or FDD (Frequency Division Duplex). In the case where the TDD is used, one frequency band is set for each CC. In the case where the FDD is used, a pair of a frequency band for UL and a frequency band for DL is set for each CC. With regard to the after-mentioned random access procedure, any of the case where a frequency band is divided into the frequency band for UL and the frequency band for DL and the case where a frequency band is not divided into the frequency band for UL and the frequency band for DL may be performed.

Figure 6:
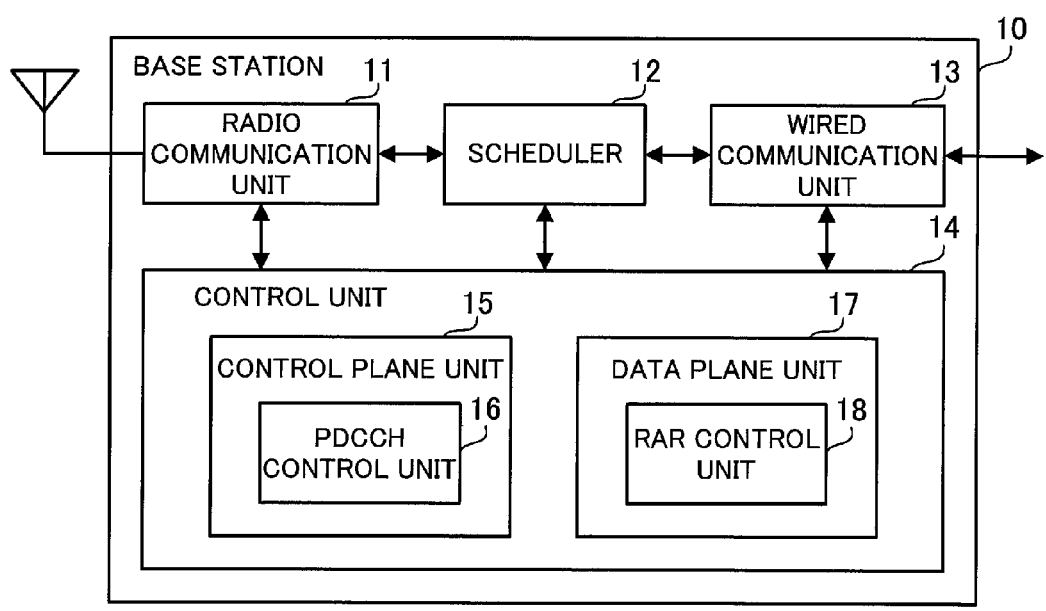
FIG. 6 is a block diagram illustrating a base station.

FIG. 6 is a block diagram illustrating the base station. The base station 10 has a radio communication unit 11, a scheduler 12, a wired communication unit 13, a control unit 14, a control plane unit 15, a PDCCH control unit 16, a data plane unit 17, and an RAR control unit 18.

The radio communication unit 11 is a radio interface which performs radio communication with the mobile station 20 and the relay station 30. The radio communication unit 11 subjects a radio signal received from the mobile station 20 or the relay station 30 to signal processing including demodulation and decoding, and extracts user data and control data. In addition, the radio communication unit 11 subjects user data and control data to be transmitted to the mobile station 20 or the relay station 30 to signal processing including modulation and coding for radio transmission.

According to the instruction from the control unit 14, the scheduler 12 performs the allocation (scheduling) of radio resources to the mobile station 20 and the relay station 30. During the random access procedure, for example, the scheduler 12 allocates the UL radio resource to the mobile station 20, and notifies the radio communication unit 11 of the allocated UL radio resource.

The wired communication unit 13 is a communication interface which performs wired communication with a host station. The wired communication unit 13 receives user data to the mobile station 20 from the host station. Under the scheduling through the scheduler 12, the received user data is transferred to the mobile station 20. The wired communication unit 13 further transfers the user data extracted by the radio communication unit 11 to the host station.

The control unit 14 controls processes of the radio communication unit 11, the scheduler 12, and the wired communication unit 13. Within the control unit 14, the control plane unit 15 and the data plane unit 17 are provided. Within the control plane unit 15, the PDCCH control unit 16 is provided. Within the data plane unit 17, the RAR control unit 18 is provided.

The control plane unit 15 controls transmission and reception of control data between the mobile station 20, the relay station 30, and its own station. Specifically, the control plane unit 15 acquires the control data extracted by the radio communication unit 11 and performs communication control according to the control data. The control plane unit 15 further notifies the radio communication unit 11 of the control data to be transmitted to the mobile station 20 or the relay station 30. For example, the control plane unit 15 performs a process of an RRC (Radio Resource Control Protocol).

The PDCCH control unit 16 controls PDCCH signaling during the random access procedure. Specifically, the PDCCH control unit 16 determines what information is included in the dedicated preamble notification (Msg0) to be transmitted to the mobile station 20 or the relay station 30 by using the PDCCH. For example, the PDCCH control unit 16 may insert into the Msg0 a CI of the component carrier in which the data communication is performed.

The data plane unit 17 controls transmission and reception of the user data between the mobile station 20, the relay station 30, and its own station. For example, the data plane unit 17 performs processes of a PDCP (Packet Data Convergence Protocol), an RLC (Radio Link Control) protocol, and a MAC (Media Access Control) protocol.

The RAR control unit 18 controls MAC signaling during the random access procedure. Specifically, the RAR control unit 18 determines what information is included in the random access response (Msg2) to be transmitted to the mobile station 20 or the relay station 30 by using the PDSCH. For example, the RAR control unit 18 may insert into the Msg2 a CI of the component carrier in which the data communication is performed.

Figure 7:
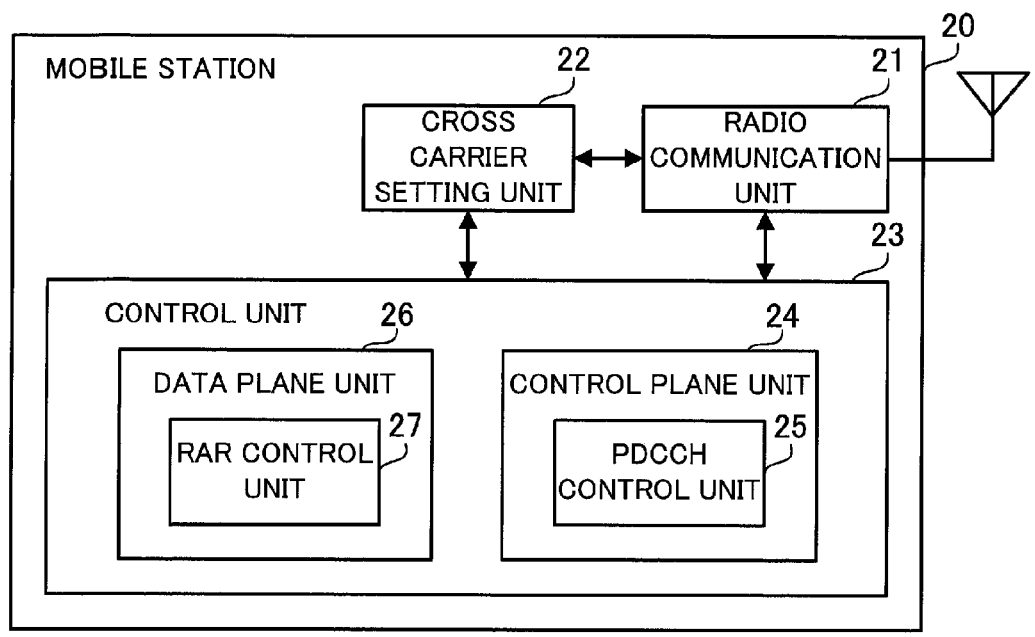
FIG. 7 is a block diagram illustrating a mobile station.

FIG. 7 is a block diagram illustrating the mobile station. The mobile station 20 has a radio communication unit 21, a cross carrier setting unit 22, a control unit 23, a control plane unit 24, a PDCCH control unit 25, a data plane unit 26, and an RAR control unit 27.

The radio communication unit 21 is a radio interface which performs radio communication with the base station 10 and the relay station 30. The radio communication unit 21 subjects a radio signal received from the base station 10 or the relay station 30 to signal processing including demodulation and decoding, and extracts user data and control data. In addition, the radio communication unit 21 subjects user data and control data to be transmitted to the base station 10 or the relay station 30 to signal processing including modulation and coding for radio transmission.

According to the instruction from the control unit 23, the cross carrier setting unit 22 performs setting of a frequency band (component carrier) in which the radio communication unit 21 performs signal processing during the random access procedure. In the case where a CI is included in the received Msg0 or Msg2, for example, the cross carrier setting unit 22 then sets the frequency band so as to perform the data communication by using the component carrier indicated by the CI. In the second embodiment, the CI is supposed to be inserted into the Msg0.

The control unit 23 controls processes of the radio communication unit 21 and the cross carrier setting unit 22. Within the control unit 23, the control plane unit 24 and the data plane unit 26 are provided. Within the control plane unit 24, the PDCCH control unit 25 is provided. Within the data plane unit 26, the RAR control unit 27 is provided.

The control plane unit 24 controls transmission and reception of control data between the base station 10, the relay station 30, and its own station. Specifically, the control plane unit 24 acquires the control data extracted by the radio communication unit 21 and performs communication control according to the control data. The control plane unit 24 further notifies the radio communication unit 21 of the control data to be transmitted to the base station 10 or the relay station 30. For example, the control plane unit 24 performs a process of an RRC.

The PDCCH control unit 25 controls PDCCH signaling during the random access procedure. Specifically, the PDCCH control unit 25 analyzes the Msg0 to be received through the PDCCH from the base station 10 or the relay station 30, and performs a process based on the information included in the Msg0. In the case where the CI is inserted into the Msg0, for example, the PDCCH control unit 25 performs reception processing of the PDSCH by using the component carrier indicated by the CI. In the start of the reception processing, activation of the component carrier and allocation of the buffer which stores the received user data may be included.

The data plane unit 26 controls transmission and reception of the user data between the base station 10, the relay station 30, and its own station. For example, the data plane unit 26 performs processes of the PDCH, RLC, and MAC.

The RAR control unit 27 controls MAC signaling during the random access procedure. Specifically, the RAR control unit 27 analyzes the Msg2 to be received through the PDSCH from the base station 10 or the relay station 30, and performs a process based on the information included in the Msg2. In the case where the CI is inserted into the Msg2, for example, reception processing of the PDSCH is performed by the component carrier indicated by the CI.

Also in the relay station 30, a radio communication unit and a control unit may be provided in the same manner as in the base station 10 and the mobile station 20. In that case, with regard to the radio communication between the base station and its own station, the control unit of the relay station 30 performs the same process as that of the control unit 23 of the mobile station 20. With regard to control of the radio communication between the mobile station 20 and its own station, the control unit of the relay station 30 further performs the same process as that of the control unit 14 of the base station 10.

Figure 8:
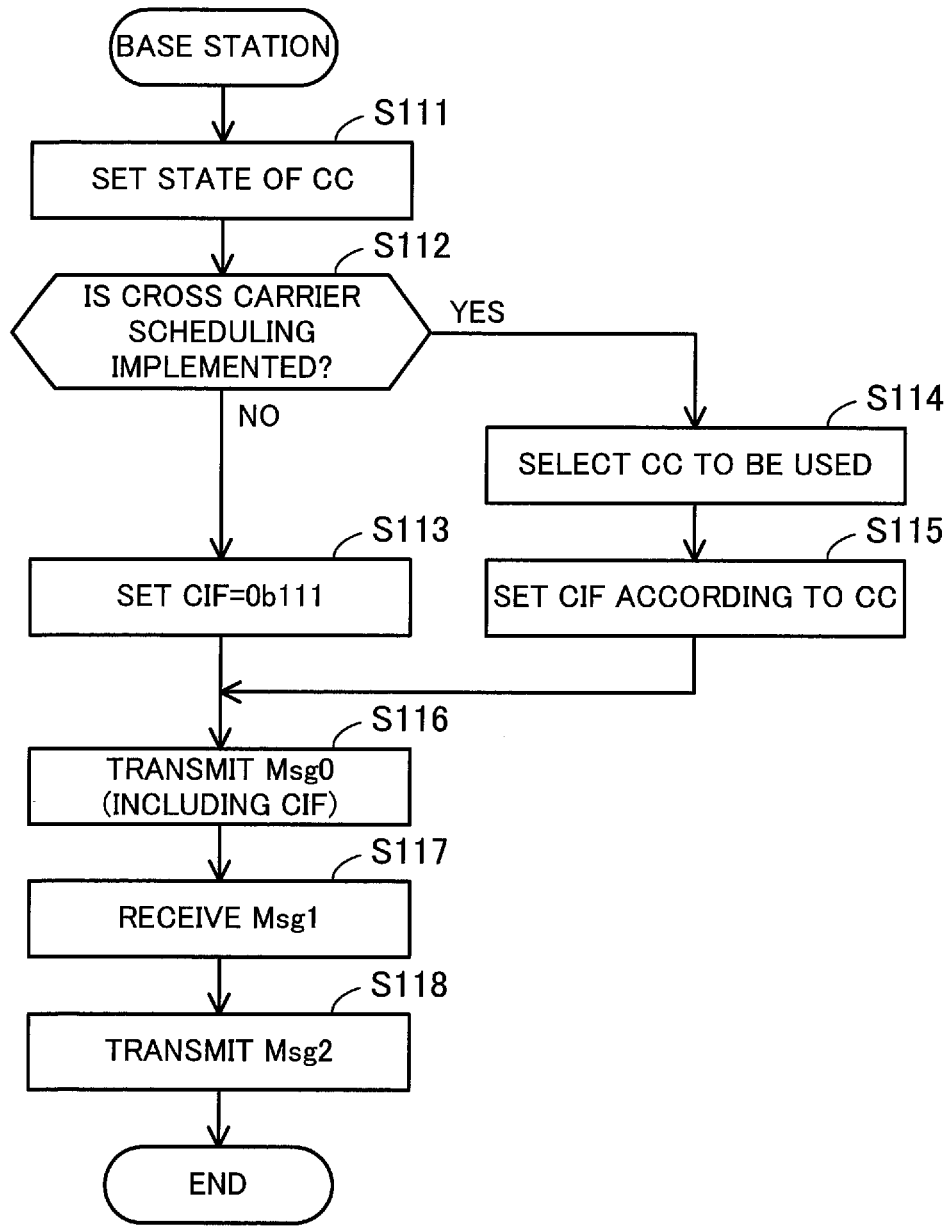
FIG. 8 is a flowchart illustrating a process of a base station according to a second embodiment.

FIG. 8 is a flowchart illustrating a process of the base station according to the second embodiment. The process illustrated in FIG. 8 includes the following steps:

(Step S111) The control unit 14 sets states of the CC#1 to #5 with respect to the mobile station 20. Specifically, the control unit 14 identifies the above-described "Configured but Deactivated CC", "Configured and Activated CC", and "PDCCH monitoring set".

(Step S112) The control unit 14 determines whether to implement cross carrier scheduling. Specifically, the control unit 14 determines whether to perform the data communication except for the component carrier in which the dedicated preamble notification (Msg0) is transmitted. The control unit 14 determines whether to implement the cross carrier scheduling, for example, based on a size of data to be transmitted to the mobile station 20 and communication quality of the component carrier in which the Msg0 is transmitted. If not, the process advances to step S113. If so, the process proceeds to step S114.

(Step S113) The PDCCH control unit 16 sets 0b111 in a CI field (CIF) included in the Msg0. This binary digit string represents that data communication is performed by the component carrier in which the Msg0 is transmitted. In place of 0b111, the PDCCH control unit 16 may set the 3-bit CI indicating the component carrier in which the Msg0 is transmitted. The process then proceeds to step S116.

(Step S114) From among the CC#1 to #5, the control unit 14 selects one or a plurality of the component carriers in which the data communication is performed except for the component carrier in which the Msg0 is transmitted. The control unit 14 selects the component carrier, for example, based on a size of data to be transmitted to the mobile station 20 or communication quality of the CC#1 to #5.

(Step S115) The PDCCH control unit 16 sets a 3-bit CIF indicating the component carrier selected at step S114 in a CIF included in the Msg0. The PDCCH control unit 16 transmits the Msg0 for each component carrier selected at step S114.

(Step S116) The radio communication unit 11 transmits the Msg0 including the CIF set at step S113 or S115 to the mobile station 20 by using the component carrier included in the "PDCCH monitoring set". In the case where the plurality of the component carriers are selected at step S114, the radio communication unit 11 transmits a plurality of the Msg0 sets. The plurality of the Msg0 sets may be transmitted by the same radio transmission unit (e.g., the same subframe), or dispersed into the different radio transmission units (e.g., different subframes) for transmission.

(Step S117) In the case where the component carrier notified by the Msg0 is set as the "Configured but Deactivated CC" (de-active state), the control unit 14 changes it into the "Configured and Activated CC" (active state). The radio communication unit 11 receives the random access preamble (Msg1) from the mobile station 20 by using the component carrier notified by the Msg0.

(Step S118) The RAR control unit 18 generates the random access response (Msg2) not including the CIF. The radio communication unit 11 transmits the Msg2 to the mobile station by using the component carrier in which the Msg1 is received. Then, the data communication is performed by the component carrier in which the Msg1 and the Msg2 are transmitted and received.

Figure 9:
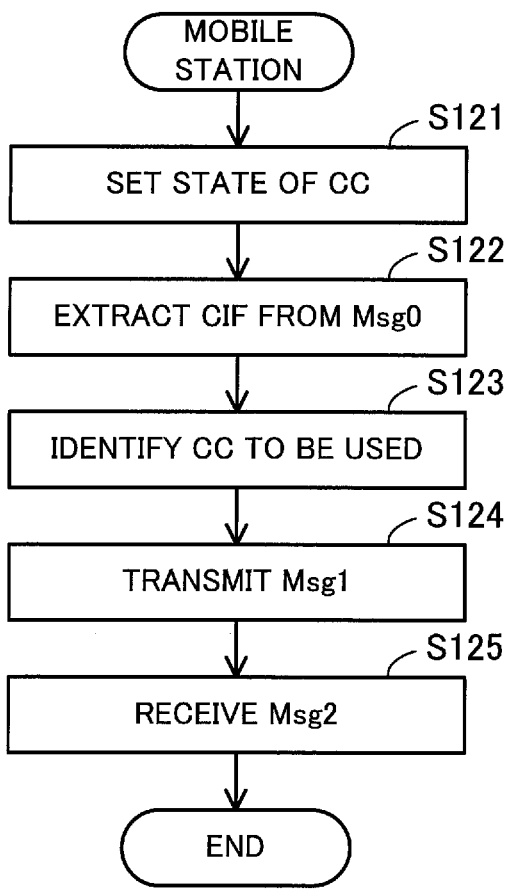
FIG. 9 is a flowchart illustrating a process of a mobile station according to a second embodiment.

FIG. 9 is a flowchart illustrating a process of the mobile station according to the second embodiment. The process illustrated in FIG. 9 includes the following steps:

(Step S121) The control unit 23 sets states of the CC#1 to #5. Specifically, the control unit 23 identifies the "Configured but Deactivated CC", the "Configured and Activated CC", and the "PDCCH monitoring set". The radio communication unit 21 monitors the PDCCH of the component carrier included in the "PDCCH monitoring set".

(Step S122) The radio communication unit 21 receives the Msg0 from the base station 10 by using the component carrier included in the "PDCCH monitoring set". The PDCCH control unit extracts the CIF included in the Msg0. In the case where the plurality of the Msg0 sets are received, the PDCCH control unit extracts the CIF in each Msg0.

(Step S123) The PDCCH control unit 25 identifies the component carrier indicated by the CIF extracted at step S122, and performs reception processing of the PDSCH by using the above component carrier. In the case where the component carrier indicated by the CIF is set as the "Configured but Deactivated CC", the PDCCH control unit 25 changes it into the "Configured and Activated CC". The cross carrier setting unit 22 sets a frequency band for performing signal processing.

(Step S124) The radio communication unit 21 transmits the Msg1 using a signal sequence specified by the Msg0 to the base station 10 through the PRACH of the component carrier indicated by the CIF. In the case where the plurality of the Msg0 sets are received and the plurality of the component carriers are identified at step S123, the radio communication unit 21 transmits the Msg1 for each identified component carrier. The radio communication unit 21 may transmit a plurality of the Msg1 sets at the same timing or at the different timing.

(Step S125) The radio communication unit 21 receives the Msg2 from the base station 10 by using the component carrier in which the Msg1 is transmitted. The RAR control unit 27 performs a process based on information included in the Msg2. The radio communication unit 21 performs data communication by using the component carrier in which the Msg1 and the Msg2 are transmitted and received.

Figure 10:
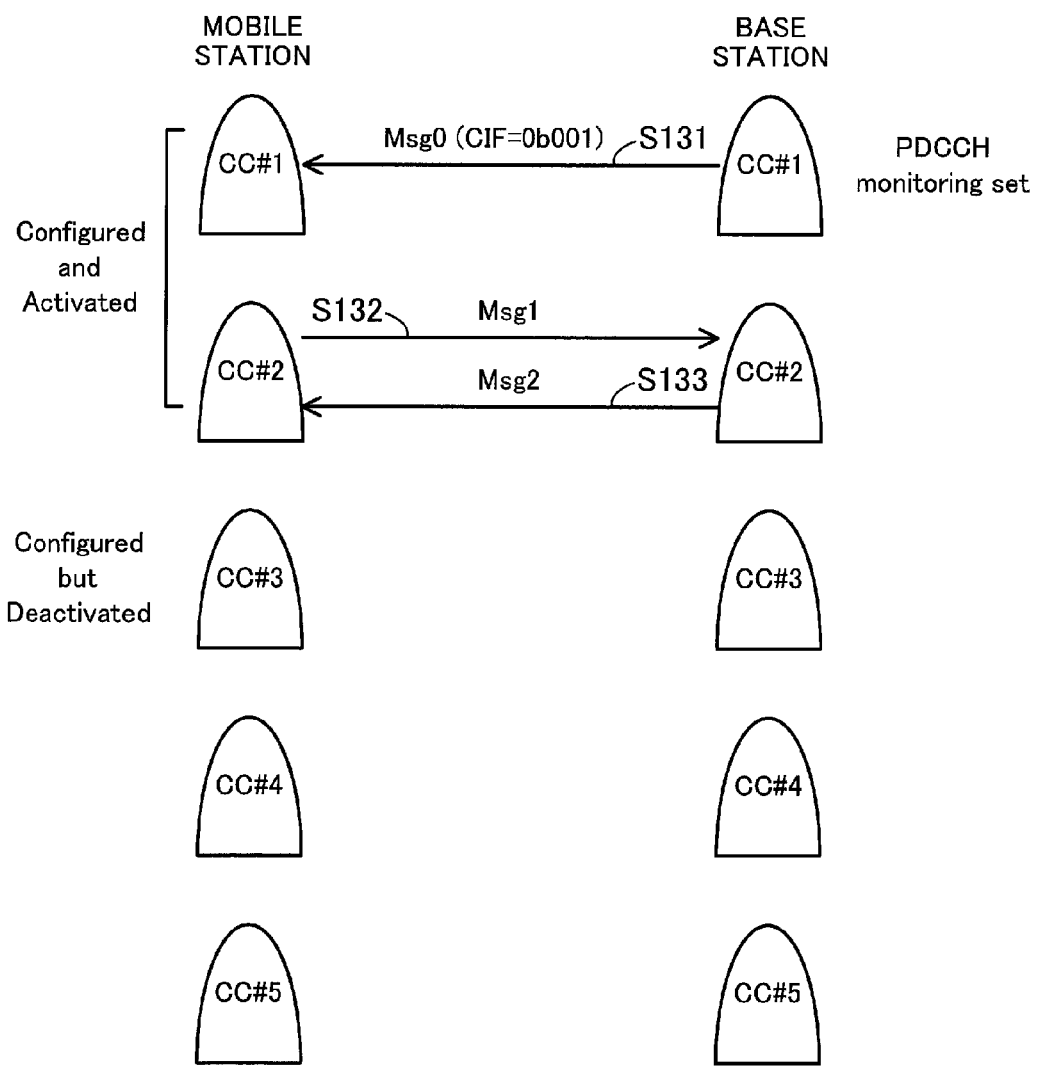
FIG. 10 illustrates a first random access example according to a second embodiment.

FIG. 10 illustrates a first random access example according to the second embodiment. Suppose here that the mobile station 20 sets the CC#1 and #2 as the "Configured and Activated CC" and the CC#3 to #5 as the "Configured but Deactivated CC". Suppose further that the "PDCCH monitoring set" includes only the CC#1.

(Step S131) The base station 10 transmits the Msg0 including CIF=0b001 to the mobile station 20 by using the CC#1 set as the "PDCCH monitoring set".

(Step S132) The mobile station 20 transmits the Msg1 to the base station 10 by using the CC#2 indicated by the CIF=0b001. Since the CC#2 is set as the "Configured and Activated CC", the mobile station 20 need not change a state of the CC#2.

(Step S133) The base station 10 transmits the Msg2 to the mobile station 20 by using the CC#2 in which the Msg1 is received. For example, the mobile station 20 then transmits data to the base station 10 by using the CC#2.

Transmission characteristics of radio signals are different in each component carrier (in each frequency band). Therefore, when the Msg1 and the Msg2 are transmitted and received by the component carrier in which the data communication is performed, stabilization of the data communication is effectively attained. In addition, for ease of explanation of FIG. 10, only the CC#1 is set as the "PDCCH monitoring set" and further any CC may be also set as the "PDCCH monitoring set". In this case, the Msg0 is transmitted by the CC set as the "PDCCH monitoring set".

Figure 11:
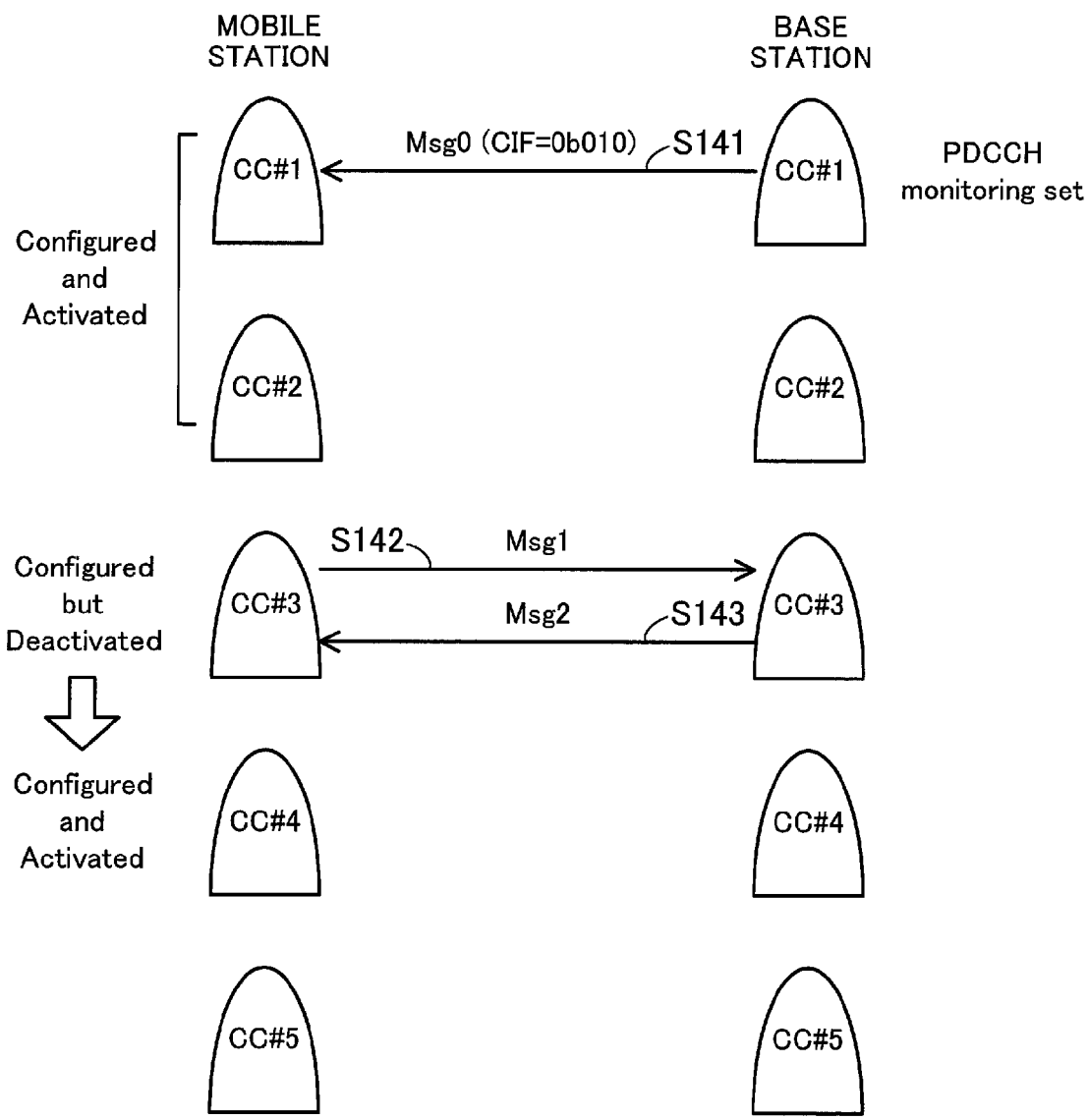
FIG. 11 illustrates a second random access example according to a second embodiment.

FIG. 11 illustrates a second random access example according to the second embodiment. States of the CC#1 to #5 at the time of starting the random access procedure are the same as those of FIG. 10.

(Step S141) The base station 10 transmits the Msg0 including CIF=0b010 to the mobile station 20 by using the CC#1 set as the "PDCCH monitoring set". Since the CC#3 indicated by the CIF=0b010 is set as the "Configured but Deactivated CC", it is activated and changed into the "Configured and Activated CC".

(Step S142) The mobile station 20 transmits the Msg1 to the base station 10 by using the CC#3 indicated by the CIF=0b010. At this time, in the same manner as in the base station 10, the mobile station 20 activates the CC#3 and changes it into the "Configured and Activated CC".

(Step S143) The base station 10 transmits the Msg2 to the mobile station 20 by using the CC#3 in which the Msg1 is received. For example, the mobile station 20 then transmits data to the base station 10 by using the CC#3.

While performing a procedure for transmitting and receiving the Msg0 and the Msg1, the base station 10 and the mobile station 20 change a state of the CC#3. Specifically, the Msg0 and the Msg1 double as signaling for changing a state of the CC#3. Accordingly, the base station 10 and the mobile station 20 need not separately perform the signaling for changing a state of the CC#3.

Figure 12:
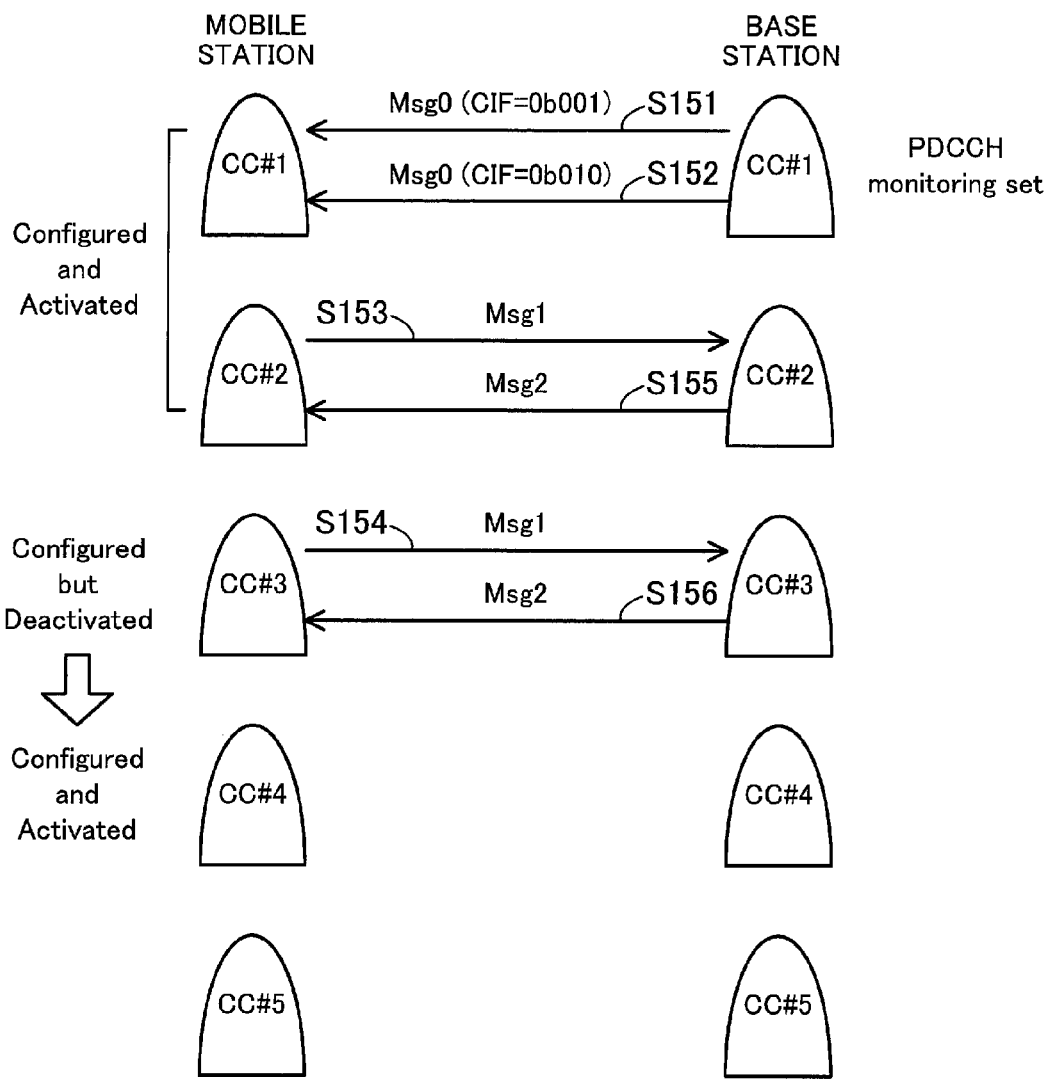
FIG. 12 illustrates a third random access example according to a second embodiment.

FIG. 12 illustrates a third random access example according to the second embodiment. States of the CC#1 to #5 at the time of starting the random access procedure are the same as those of FIG. 10.

(Step S151) The base station 10 transmits the Msg0 including the CIF=0b001 to the mobile station 20 by using the CC#1 set as the "PDCCH monitoring set".

(Step S152) The base station 10 transmits the Msg0 including the CIF=0b010 to the mobile station 20 by using the CC#1. Since the CC#3 indicated by the CIF=0b010 is set as the "Configured but Deactivated CC", the base station 10 activates the CC#3 and changes it into the "Configured and Activated CC". The base station 10 may further transmit two Msg0 sets at the same timing.

(Step S153) The mobile station 20 transmits the Msg1 to the base station 10 by using CC#2 indicated by the CIF=0b001.

(Step S154) The mobile station 20 transmits the Msg1 to the base station 10 by using the CC#3 indicated by the CIF=0b010. At this time, in the same manner as in the base station 10, the mobile station 20 activates the CC#3 and changes it into the "Configured and Activated CC". The mobile station 20 may further transmit two Msg1 sets at the same timing.

(Step S155) By using the CC#2, the base station 10 receives the Msg1 and transmits the Msg2 to the mobile station 20. By using the CC#2, for example, the mobile station 20 then transmits data to the base station 10.

(Step S156) By using the CC#3, the base station 10 receives the Msg1 and transmits the Msg2 to the mobile station 20. By using the CC#3, for example, the mobile station 20 then transmits data to the base station 10.

The signal sequence specified by the Msg0 transmitted at step S151 and the signal sequence specified by the Msg0 transmitted at step S152 may be the same or different from each other. Specifically, with respect to the Msg1 transmitted at step S153 and the Msg1 transmitted at step S154, the mobile station 20 may use the same signal sequence or different signal sequence.

In the above-described example of the cross carrier scheduling, the base station 10 is supposed to recognize states of the CC#1 to #5 of the mobile station 20. In the case where the base station 10 or the mobile station 20 has a reason that some of the component carriers among the CC#1 to #5 are unusable, the base station 10 excludes such a component carrier and selects the component carrier in which the data communication is performed. The above-described cross carrier scheduling is implemented, for example, at the time when the mobile station 20 performs random access to the base station 10 from a state of the connected mode or idle mode.

FIG. 13 illustrates a first format example of the Msg0. The Msg0 is a control message to be transmitted through the PDCCH. As a field, the Msg0 includes Flag, Local/Dist, Resource Block Assignment, Preamble Index, PRACH Mask Index, Carrier Indicator, and CRC. A bit length of the Resource Block Assignment field is different depending on a DL bandwidth of the component carrier. FIG. 13 illustrates a bandwidth by using the number of RBs (resource blocks). Here, 100 RBs are equal to a 20 MHz width.

Fields except the Carrier Indicator field are described, for example, in "Evolved Universal Terrestrial Radio Access (E-UTRA); Multiplexing and channel coding" (3GPP, TS 36.212 V9.0.0, 2009-12). In the second embodiment, the Flag is fixed to 1, the Local/Dist is fixed to 0, and all of the Resource Block Assignment sets are fixed to 1. When a fixed bit is inserted to lengthen the Msg0, accuracy of the error detection is improved. The Preamble Index indicates information for specifying the signal sequence used for the Msg1. The PRACH Mask Index indicates information used for transmitting the Msg1. The CRC indicates a parity used for the error detection of the Msg0.

As described above, the Carrier Indicator indicates a 3-bit binary bit string for specifying the component carrier in which the data transmission is performed. In an example of FIG. 13, the Carrier Indicator field is inserted between the PRACH Mask Index field and the CRC field. In the above-described literatures "Evolved Universal Terrestrial Radio Access (E-UTRA); and Multiplexing and channel coding", there is described a format on which the Padding field is provided between the PRACH Mask Index field and the CRC field.

FIG. 14 illustrates a second format example of the Msg0. In the format example of FIG. 14, most significant 3 bits of the binary bit string allocated to the Resource Block Assignment field in the format example of FIG. 13 is allocated to the Carrier Indicator field. Specifically, the Carrier Indicator field is inserted between the Local/Dist field and the Resource Block Assignment field. The Padding field is provided between the PRACH Mask Index field and the CRC field. All the Padding sets are fixed to 1.

FIG. 15 illustrates a third format example of the Msg0. In the format example of FIG. 15, least significant 3 bits of the binary bit string allocated to the Resource Block Assignment field in the format example of FIG. 13 is allocated to the Carrier Indicator field. Specifically, the Carrier Indicator field is inserted between the Resource Block Assignment field and the Preamble index field.

In addition to format examples of FIGS. 14 and 15, there is also considered a method in which intermediate significant 3 bits of the binary digit string allocated to the resource block assignment field of the format example of FIG. 13 are allocated to the carrier indicator field.

Incidentally, in the format example, a data length of the Msg0 is different depending on a DL bandwidth of the component carrier. Therefore, a plurality of the Msg0 sets having different data lengths may be transmitted by the CC#1. Suppose, for example, that a DL bandwidth of the CC#2 is 20 MHz and a DL bandwidth of the CC#3 is 10 MHz. In this case, the Msg0 corresponding to the CC#2 and the Msg0 corresponding to the CC#3 have different data lengths.

On the other hand, the mobile station 20 blind-decodes the PDCCH and extracts the Msg0. Accordingly, for reducing an overhead of the blind decoding, the mobile station 20 preferably adjusts a size so that a size of the Msg0 may be constant even if the DL bandwidth is different depending on the component carrier. Further, for facilitating the extraction of the CIF, the mobile station 20 preferably makes constant a position of the CIF in the entire Msg0.

Figure 16:
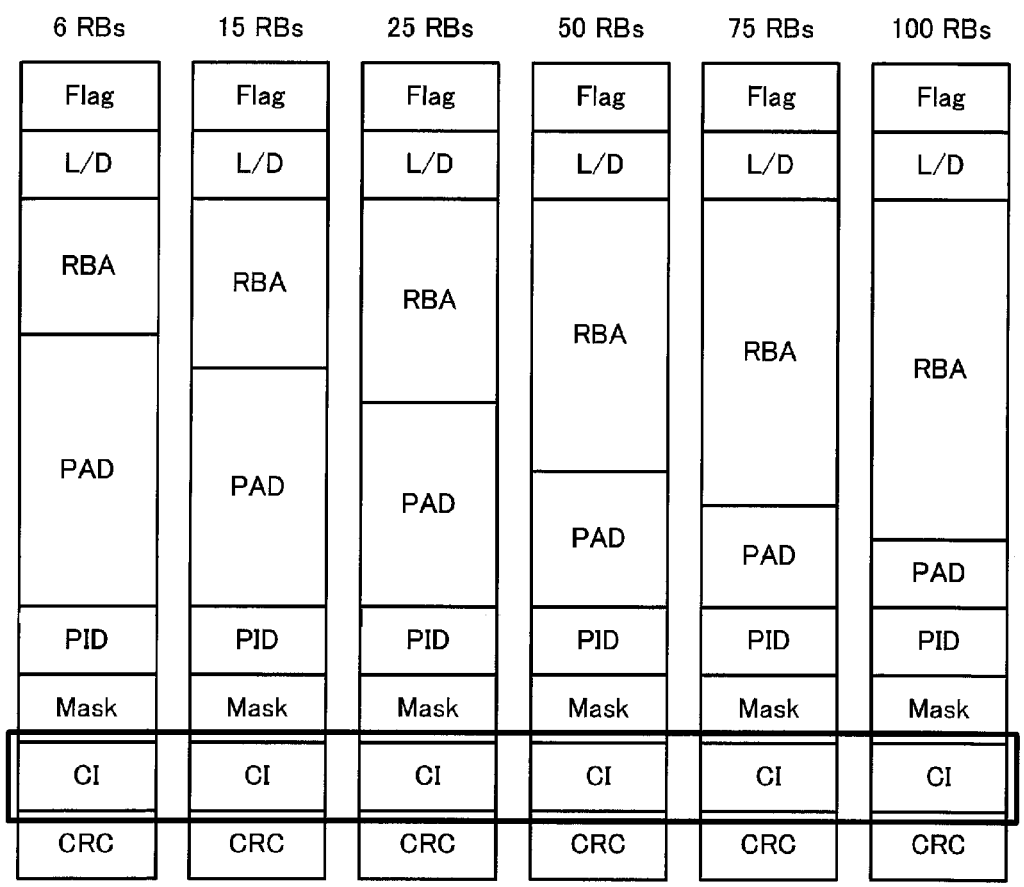
FIG. 16 illustrates a first size adjustment example of a Msg0.

FIG. 16 illustrates a first size adjustment example of the Msg0. The size adjustment example of FIG. 16 corresponds to the format example illustrated in FIG. 13. In this size adjustment example, the PADDING field having a length according to the DL bandwidth is inserted between the Resource block Assignment field and the Preamble Index field. Through the process, a size of the Msg0 becomes constant without relation to the DL bandwidth. Since a position of the CIF is constant, after the decoding of the Msg0, the CIF is easily extracted to identify the component carrier to be used. Further, since positions of the Preamble Index field and the PRACH Mask Index field are constant, the Msg1 is easily generated with reference to the above fields.

FIG. 17 illustrates a second size adjustment example of the Msg0. The size adjustment example of FIG. 17 corresponds to the format example illustrated in FIG. 14. In the same manner as in the size adjustment example of FIG. 16, the PADDING field having a length according to the DL bandwidth is inserted between the Resource block Assignment field and the Preamble Index field. Through the process, a size of the Msg0 becomes constant, and at the same time a position of the CIF becomes constant without relation to the DL bandwidth. Positions of the Preamble Index field and the PRACH Mask Index field further become constant.

FIG. 18 illustrates a third size adjustment example of the Msg0. The size adjustment example of FIG. 18 corresponds to the format example illustrated in FIG. 15. In this size adjustment example, the PADDING field having a length according to the DL bandwidth is inserted between the Local/Dist field and the Resource Block Assignment field. Through the process, a size of the Msg0 becomes constant, and at the same time a position of the CIF becomes constant without relation to the DL bandwidth. Positions of the Preamble Index field and the PRACH Mask Index field further become constant.

According to this mobile communication system of the second embodiment, by transmitting the Msg0 to the mobile station 20, the base station 10 gives to the mobile station 20 the use permission of the component carriers except the component carrier in which the Msg0 is transmitted. In other words, the base station 10 implements the cross carrier scheduling by using the Msg0. Accordingly, the base station 10 and the mobile station 20 need not separately perform a procedure of the use permission of the component carrier.

The base station 10 and the mobile station 20 further change the component carrier in a de-active state into that in an active state along with the transmission and reception of the Msg0 and the Msg1. Accordingly, the base station 10 and the mobile station 20 need not separately perform a procedure of the state change of the component carrier. As can be seen from the above description, the base station 10 and the mobile station 20 effectively perform use control of the plurality of the component carriers.

Third Embodiment

Next, a third embodiment will be described. The third embodiment will be described with a focus on a difference from the above-described second embodiment, and the same matters will not be repeated. In the second embodiment, the cross carrier scheduling is implemented by the Msg0, and on the other hand the cross carrier scheduling is implemented by the Msg2 in the third embodiment.

A mobile communication system according to the third embodiment is implemented by the same system configuration as that of the mobile communication system according to the second embodiment illustrated in FIG. 2. A base station and mobile station of the third embodiment are implemented by the same block configurations as those of the base station 10 and mobile station 20 of the second embodiment illustrated in FIGS. 6 and 7. The third embodiment will be described below by using reference numerals used in FIGS. 2, 6, and 7.

Figure 19:
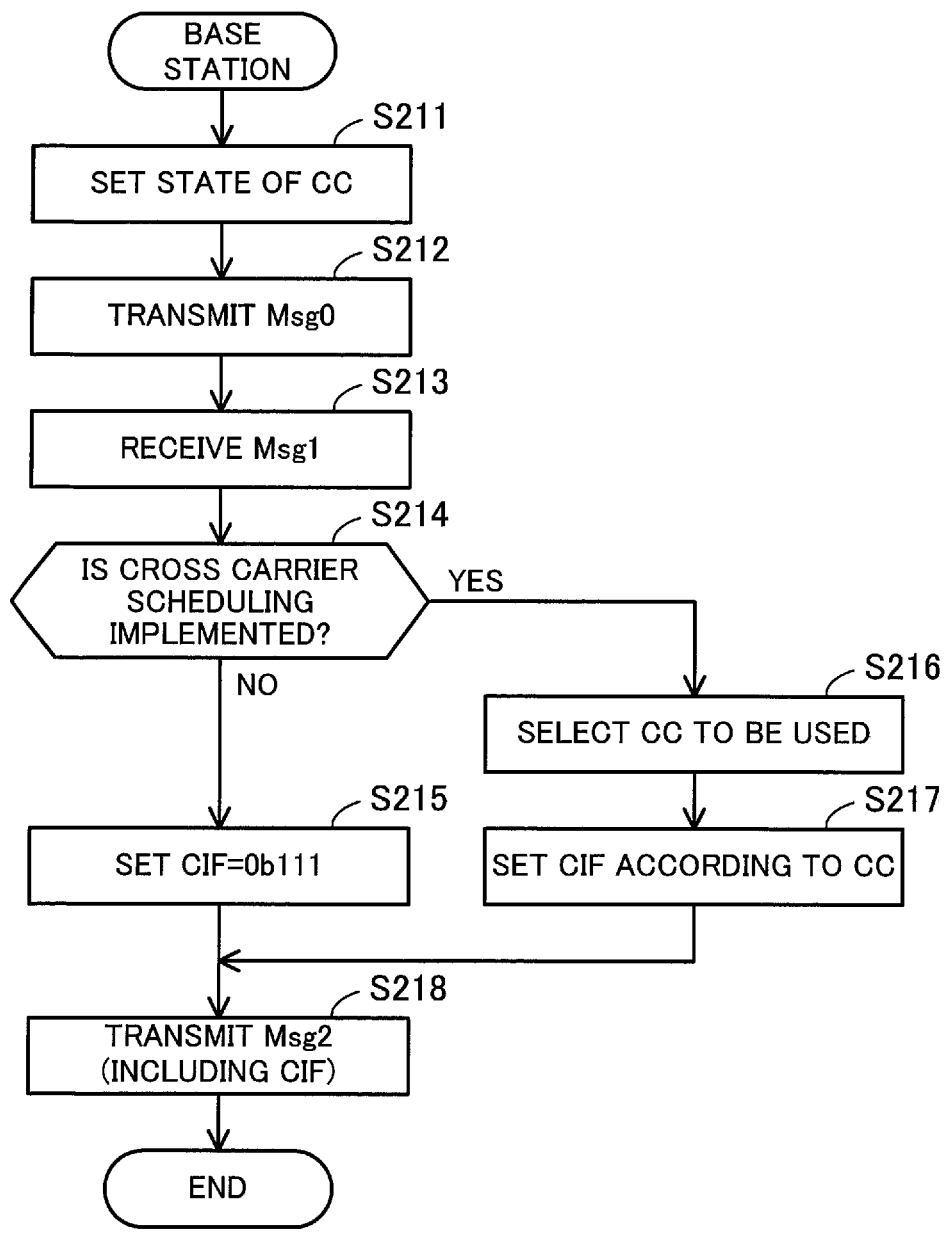
FIG. 19 is a flowchart illustrating a process of a base station according to a third embodiment.

FIG. 19 is a flowchart illustrating a process of the base station according to the third embodiment. The process illustrated in FIG. 19 includes the following steps:

(Step S211) The control unit 14 sets states of the CC#1 to #5 with regard to the mobile station 20. Specifically, the control unit 14 identifies the above-described "Configured but Deactivated CC", "Configured and Activated CC", and "PDCCH monitoring set".

(Step S212) The PDCCH control unit 16 generates the dedicated preamble notification (Msg0) not including the CIF. The radio communication unit 11 transmits the Msg0 to the mobile station 20 by using the component carrier included in the "PDCCH monitoring set".

(Step S213) The radio communication unit 11 receives the random access preamble (Msg1) from the mobile station 20 by using the component carrier in which the Msg0 is transmitted.

(Step S214) The control unit 14 determines whether to implement the cross carrier scheduling. Specifically, the control unit 14 determines whether to perform the data communication except for the component carrier in which the random access response (Msg2) is transmitted. If not, the process advances to step S215. If so, the process proceeds to step S216.

(Step S215) The RAR control unit 18 sets the 0b111 in the CIF included in the Msg2. This binary digit string indicates that the data communication is performed by the component carrier in which the Msg2 is transmitted. The process then proceeds to step S218.

(Step S216) From among the CC#1 to #5, the control unit 14 selects one or a plurality of component carriers in which the data communication is performed, except for the component carrier in which the Msg2 is transmitted.

(Step S217) The RAR control unit 18 sets a 3-bit CIF indicating the component carrier selected at step S216. Note that the Msg2 is transmitted for each component carrier selected at step S216.

(Step S218) The radio communication unit 11 transmits the Msg2 including the CIF set at step S215 or S217 to the mobile station 20 by using the component carrier included in the "PDCCH monitoring set. In the case where the plurality of the component carriers are selected at step S216, the radio communication unit 11 transmits a plurality of the Msg2 sets. In the case where the component carrier notified by the Msg2 is set as the "Configured but Deactivated CC" (de-active state), the control unit 14 changes it into the "Configured and Activated CC" (active state). The radio communication unit 11 then performs the data communication by using the component carrier notified by the Msg2.

Figure 20:
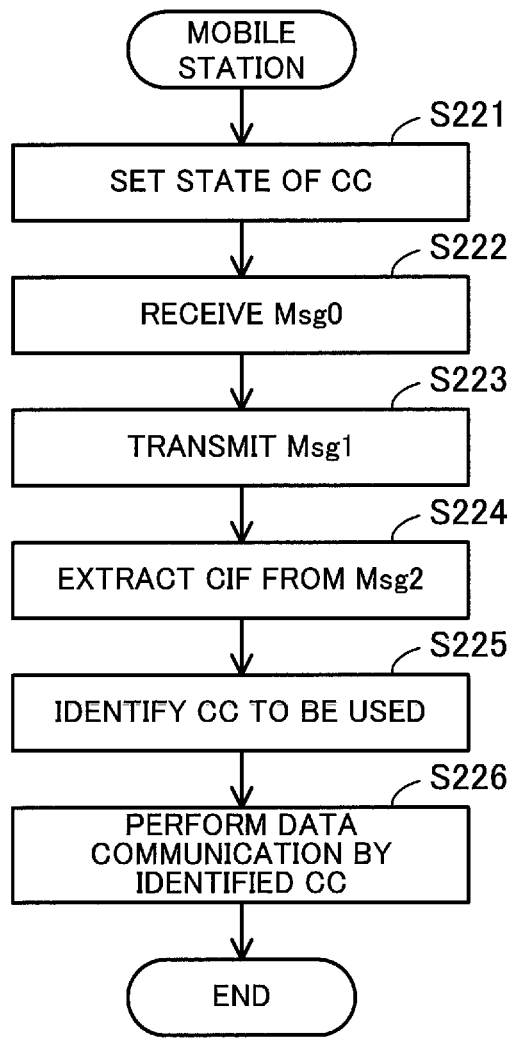
FIG. 20 is a flowchart illustrating a process of a mobile station according to a third embodiment.

FIG. 20 is a flowchart illustrating a process of the mobile station according to the third embodiment. The process illustrated in FIG. 20 includes the following steps:

(Step S221) The control unit 23 sets states of the CC#1 to #5. Specifically, the control unit 23 identifies the "Configured but Deactivated CC", the "Configured and Activated CC", and the "PDCCH monitoring set". The radio communication unit 21 monitors the PDCCH of the component carrier included in the "PDCCH monitoring set".

(Step S222) The radio communication unit 21 receives the Msg0 not including the CIF from the base station 10 by using the component carrier included in the "PDCCH monitoring set".

(Step S223) The radio communication unit 21 transmits the Msg1 using the signal sequence specified by the Msg0 to the base station 10 by using the PRACH of the component carrier in which the Msg0 is transmitted.

(Step S224) The radio communication unit 21 receives the Msg2 from the base station 10 by using the component carrier in which the Msg1 is transmitted. The RAR control unit 27 extracts the CIF included in the Msg2. In the case where the plurality of the Msg2 sets are received, the RAR control unit 27 extracts the CIF for each Msg2.

(Step S225) The RAR control unit 27 identifies one or the plurality of the component carriers indicated by the CIF extracted at step S224, and performs reception processing of the PDSCH by using the component carriers. In the case where the component carrier indicated by the CIF is set as the "Configured but Deactivated CC", the RAR control unit 27 changes it into the "Configured and Activated CC". The cross carrier setting unit 22 sets a frequency band for performing signal processing.

(Step S226) The radio communication unit 21 performs data communication by using the component carrier identified at step S225.

Figure 21:
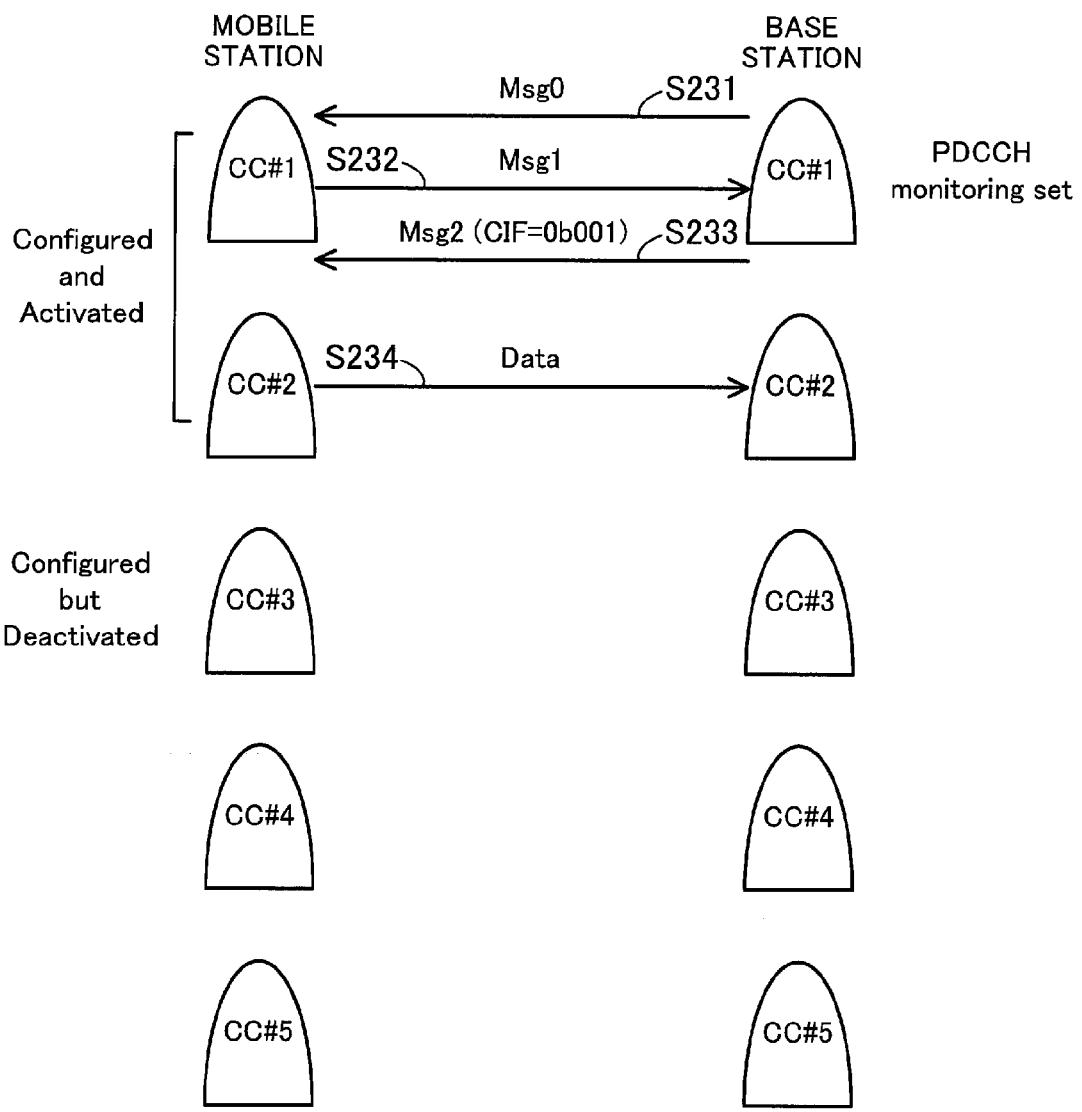
FIG. 21 illustrates a first random access example according to a third embodiment.

FIG. 21 illustrates a first random access example according to the third embodiment. Suppose here that the mobile station 20 sets the CC#1 and #2 as the "Configured and Activated CC" and the CC#3 to #5 as the "Configured but Deactivated CC". Suppose further that the "PDCCH monitoring set" includes only the CC#1.

(Step S231) The base station 10 transmits the Msg0 to the mobile station 20 by using the CC#1 set as the "PDCCH monitoring set".

(Step S232) The mobile station 20 transmits the Msg1 to the base station 10 by using the CC#1 in which the Msg0 is received.

(Step S233) The base station 10 transmits the Msg2 including the CIF=0b001 to the mobile station 20 by using the CC#1 in which the Msg1 is received. In the Msg2, timing adjustment information on the UL frequency band of the CC#2 is included.

(Step S234) By using the CC#2 indicated by the CIF=0b001, for example, the mobile station 20 transmits data to the base station 10. Note that since the CC#2 is set as the "Configured and Activated CC", the mobile station 20 need not change a state of the CC#2.

Figure 22:
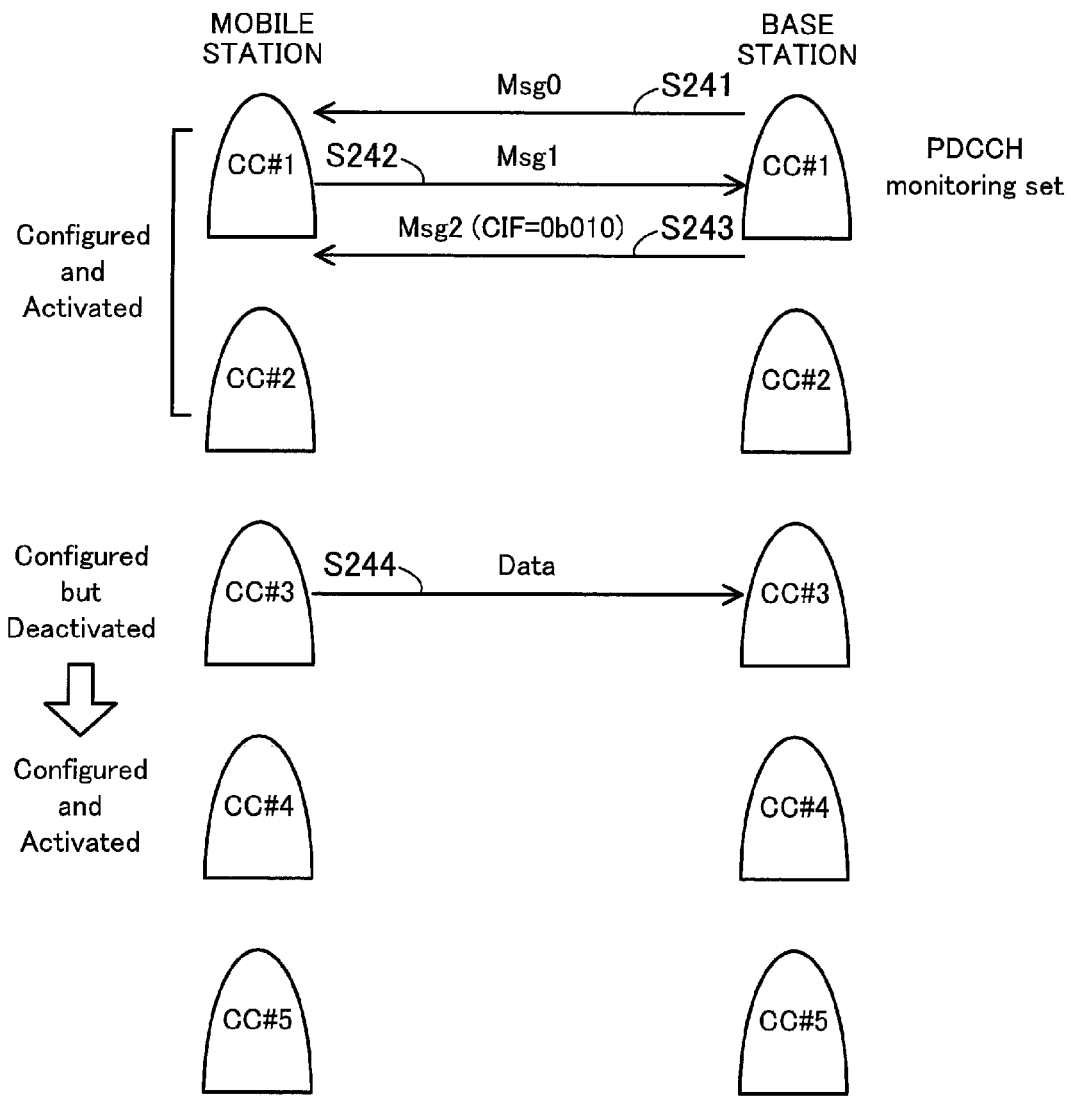
FIG. 22 illustrates a second random access example according to a third embodiment.

FIG. 22 illustrates a second random access example according to the third embodiment. The states of the CC#1 to #5 at the time of starting the random access procedure are the same as those of FIG. 21.

(Step S241) The base station 10 transmits the Msg0 to the mobile station 20 by using the CC#1 set as the "PDCCH monitoring set".

(Step S242) The mobile station 20 transmits the Msg1 to the base station 10 by using the CC#1 in which the Msg0 is received.

(Step S243) The base station 10 transmits the Msg2 including the CIF=0b010 to the mobile station 20 by using the CC#1 in which the Msg1 is received. Since the CC#3 indicated by the CIF=0b010 is set as the "Configured but Deactivated CC", the base station 10 activates the CC#3 and changes it into the "Configured and Activated CC". Note that in the Msg2, the timing adjustment information on the UL frequency band of the CC#3 is included.

(Step S244) By using the CC#3 indicated by the CIF=0b010, for example, the mobile station 20 transmits data to the base station 10. At this time, in the same manner as in the base station 10, the mobile station 20 activates the CC#3 and changes the "Configured but Deactivated CC" into the "Configured and Activated CC".

Figure 23:
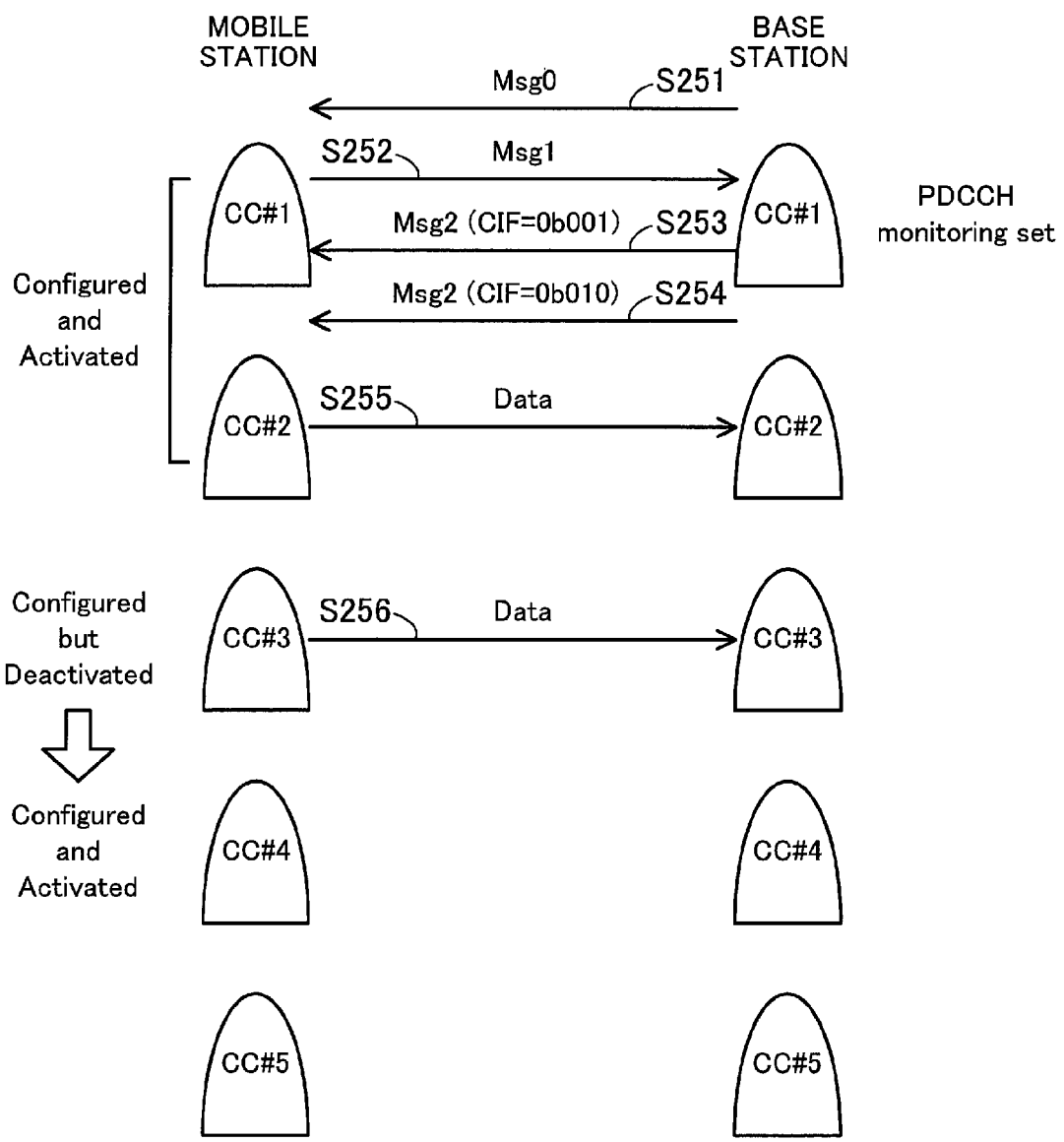
FIG. 23 illustrates a third random access example according to a third embodiment.

FIG. 23 illustrates a third random access example according to the third embodiment. The states of the CC#1 to #5 at the time of starting the random access procedure are the same as those of FIG. 21.

(Step S251) The base station 10 transmits the Msg0 to the mobile station 20 by using the CC#1 set as the "PDCCH monitoring set".

(Step S252) The mobile station 20 transmits the Msg1 to the base station 10 by using the CC#1 in which the Msg0 is received.

(Step S253) The base station 10 transmits the Msg2 including the CIF=0b001 to the mobile station 20 by using the CC#1 in which the Msg1 is received. Note that in the Msg2, the timing adjustment information on the UL frequency band of the CC#2 is included.

(Step S254) The base station 10 transmits the Msg2 including the CIF=0b010 to the mobile station 20 by using the CC#1 in which the Msg1 is received. Since the CC#3 indicated by the CIF=0b010 is set as the "Configured but Deactivated CC", the base station 10 activates the CC#3 and changes it into the "Configured and Activated CC". Note that in the Msg2, the timing adjustment information on the UL frequency band of the CC#3 is included.

(Step S255) By using the CC#2 indicated by the CIF=0b001, for example, the mobile station 20 transmits data to the base station 10.

(Step S256) By using the CC#3 indicated by the CIF=0b010, for example, the mobile station 20 transmits data to the base station 10. At this time, in the same manner as in the base station 10, the mobile station 20 activates the CC#3 and changes the "Configured but Deactivated CC" into the "Configured and Activated CC".

FIG. 24 illustrates a first format example of the Msg2. In the format example of FIG. 24, the Msg2 includes a Carrier Indicator of 3 bits, a Timing Advance Command of 6 bits, a UL grant of 20 bits, and a Temporary C-RNTI of 16 bits.

As described above, the carrier indicator is a value for discriminating the component carrier in which the data transmission is performed. The Timing Advance Command is a value indicating an amount of the timing adjustment at the time of allowing the mobile station 20 to correct the UL transmission timing. The UL grant is information illustrating the UL radio resource allocated to the mobile station 20. The Temporary C-RNTI is an identifier dynamically allocated to the mobile station 20 through the base station 10. In addition, the Timing Advance Command indicates the amount of timing adjustment relating to the component carrier indicated by the Carrier Indicator. Accordingly, the mobile station 20 adjusts the UL transmission timing after the random access procedure by using the Timing Advance Command.

Here, the Timing Advance Command is described, for example, in "Evolved Universal Terrestrial Radio Access (E-UTRA); Physical layer procedures" (3GPP TS 36.213 V9.0.1, 2009-12).

In the above-described literature, two types of an absolute value in a displacement of the timing and a relative value using as a reference the currently corrected timing are defined as the Timing Advance Command. The absolute value is used in the case where the Timing Advance Command is first notified, or a validity period of a previously notified Timing Advance Command is expired. The relative value is used in the case where the validity period of the previously notified Timing Advance Command is not expired. The absolute value is represented by 11 bits and the relative value is represented by 6 bits. In the format example of FIG. 24, the relative value is supposed to be used.

In the above format example, a most significant reserved bit is set to one. A most significant R bit of the Msg2 not including the CIF is set to zero. Through the process, the mobile station 20 easily determines whether the Msg2 includes the CIF.

Figure 25:
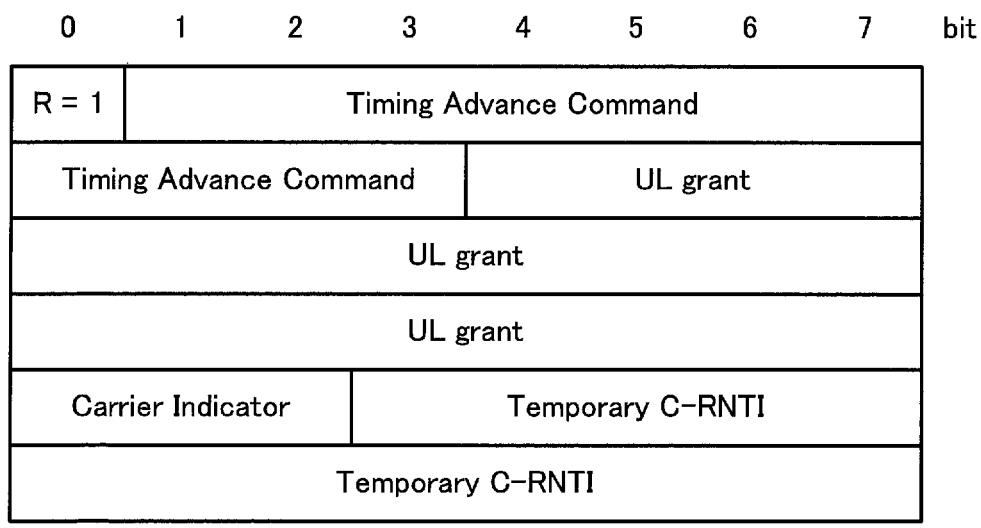
FIG. 25 illustrates a second format example of a Msg2.

FIG. 25 illustrates a second format example of the Msg2. In the format example of FIG. 25, the Msg2 includes the Timing Advance Command of 11 bits, the UL grant of 20 bits, the Carrier Indicator of 3 bits, and the Temporary C-RNTI of 13 bits. In the case of this format example, the absolute value may be used as the Timing Advance Command. On the other hand, the Temporary C-RNTI is smaller by 3 bits than that in the case of FIG. 24. The base station 10 allocates an identifier capable of being represented by 13 bits or less to the mobile station 20.

Figure 26:
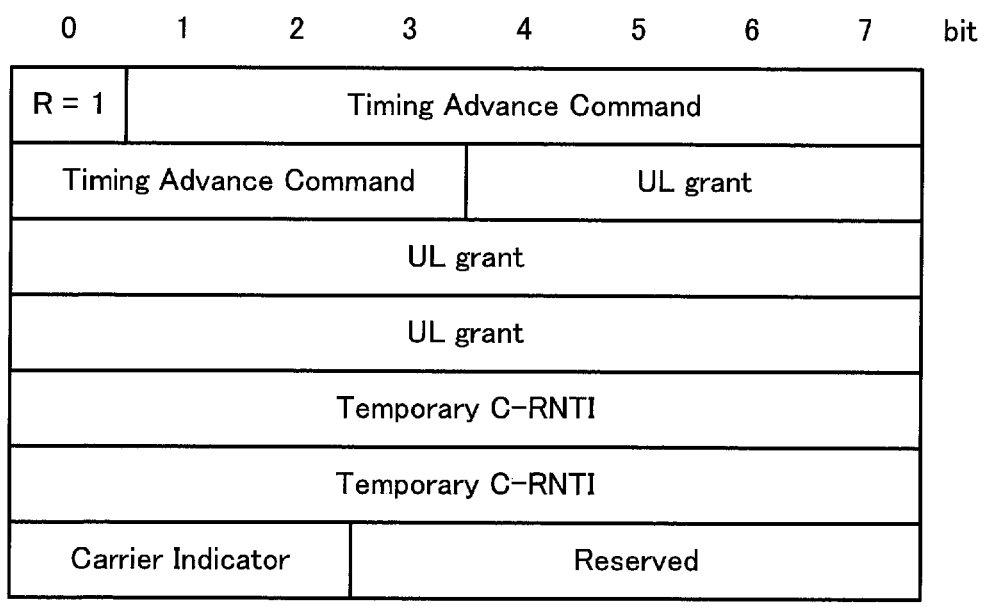
FIG. 26 illustrates a third format example of a Msg2.

FIG. 26 illustrates a third format example of the Msg2. In the format example of FIG. 26, the Msg2 includes the Timing Advance Command of 11 bits, the UL grant of 20 bits, the Temporary C-RNTI of 16 bits, and the Carrier Indicator of 3 bits. In the case of this format example, the absolute value may be used as the Timing Advance Command. The base station 10 allocates an identifier having a value larger than that of FIG. 25 to the mobile station 20. Note that a size of the Msg2 increases more than those of the format examples of FIGS. 24 and 25. In addition, the CIF may be provided on the least significant bits in FIG. 26, and further the CIF may be inserted into the other positions.

According to this mobile communication system of the third embodiment, by transmitting the Msg2 to the mobile station 20, the base station 10 gives to the mobile station 20 a use permission of the component carriers except the component carrier in which the Msg2 is transmitted. In short, the base station 10 implements the cross carrier scheduling by using the Msg2. Accordingly, the base station 10 and the mobile station 20 need not separately perform a procedure for the use permission of the component carrier.

The base station 10 and the mobile station 20 further change the component carrier in a de-active state into that in an active state along with transmission and reception of the Msg2. Therefore, the base station 10 and the mobile station 20 need not separately perform a procedure for a state change in the component carrier. As can be seen from the above description, the base station 10 and the mobile station 20 effectively perform use control of the plurality of the component carriers in the same manner as in the second embodiment.

Fourth Embodiment

Next, a fourth embodiment will be described. The fourth embodiment will be described with a focus on a difference from the above-described second and third embodiments, and the same matters will not be repeated. In the fourth embodiment, the cross carrier scheduling is implemented by the Msg2 in the same manner as in the third embodiment. Note that the non-contention based random access is supposed in the third embodiment, and on the other hand the contention based random access is supposed in the fourth embodiment.

A mobile communication system according to the fourth embodiment is implemented by the same system configuration as that of the mobile communication system according to the second embodiment illustrated in FIG. 2. A base station and mobile station according to the fourth embodiment are further implemented by the same block configuration as those of the base station 10 and mobile station 20 of the second embodiment illustrated in FIGS. 6 and 7. Hereinafter, the fourth embodiment will be described by using reference numerals used in FIGS. 2, 6, and 7.

Figure 27:
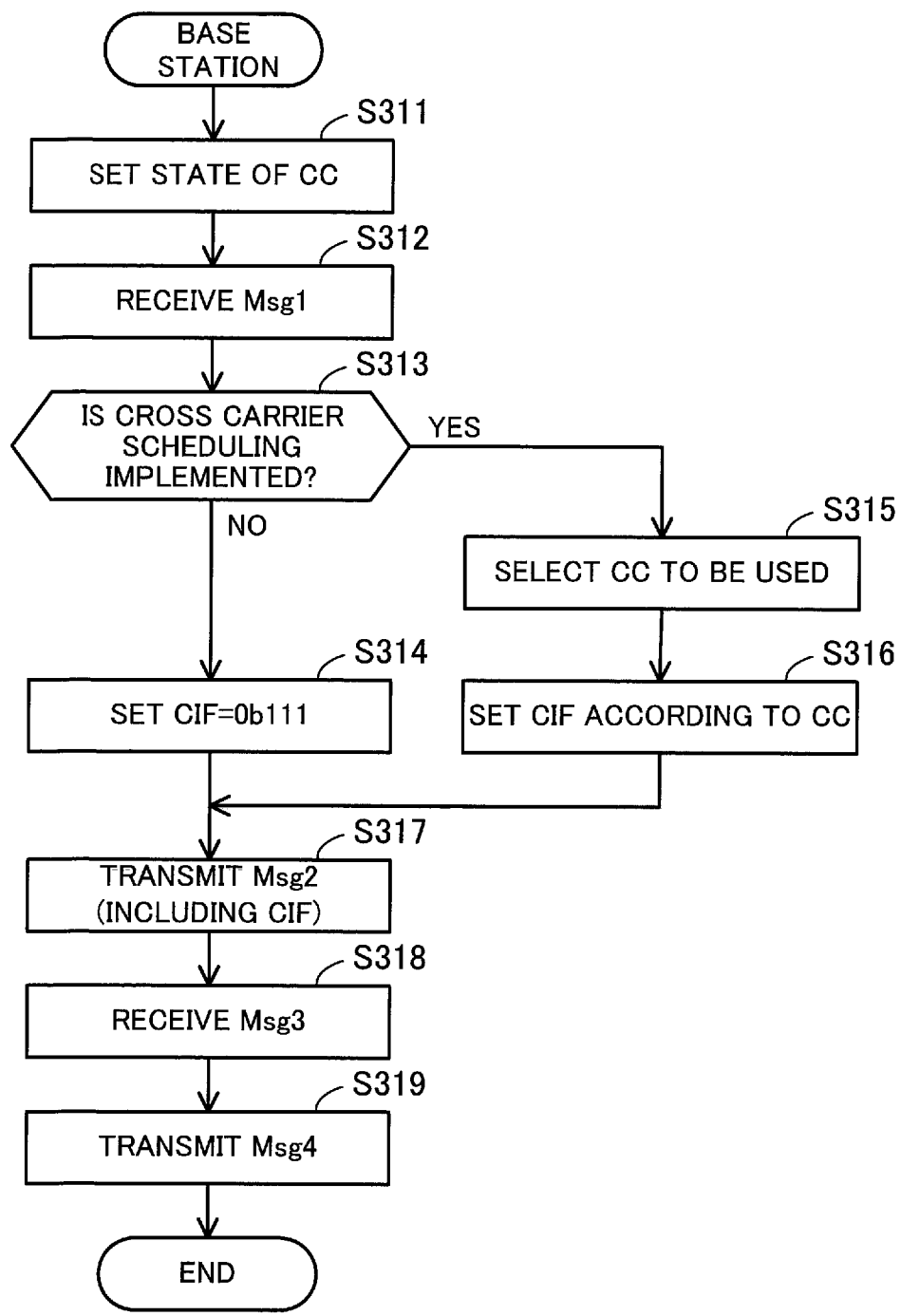
FIG. 27 is a flowchart illustrating a process of a base station according to a fourth embodiment.

FIG. 27 is a flowchart illustrating a process of the base station according to the fourth embodiment. The process illustrated in FIG. 27 includes the following steps:

(Step S311) The control unit 14 sets states of the CC#1 to #5 with regard to the mobile station 20. Specifically, the control unit 14 identifies the above-described "Configured but Deactivated CC", "Configured and Activated CC", and "PDCCH monitoring set".

(Step S312) The radio communication unit 11 receives the random access preamble (Msg1) from the mobile station 20 by using the component carrier included in the "PDCCH monitoring set". A signal sequence used in the Msg1 is randomly selected by the mobile station 20.

(Step S313) The control unit 14 determines whether to implement the cross carrier scheduling. If not, the process advances to step S314. If so, the process proceeds to step S315.

(Step S314) The RAR control unit 18 sets the 0b111 as the CIF included in the Msg2. The process then proceeds to step S317.

(Step S315) From among the CC#1 to #5, the control unit 14 selects one or a plurality of component carriers in which the data communication is performed, except for the component carrier in which the Msg2 is transmitted.

(Step S316) The RAR control unit 18 sets a 3-bit CIF indicating the component carrier selected at step S315. In addition, the Msg2 is transmitted for each component carrier selected at step S315.

(Step S317) The radio communication unit 11 transmits the Msg2 including the CIF set at step S314 or S316 to the mobile station 20 by using the component carrier in which the Msg1 is received. In the case where the plurality of the component carriers are selected at step S315, the radio communication unit 11 transmits a plurality of the Msg2 sets.

(Step S318) The radio communication unit 11 receives the Msg3 from the mobile station 20 by using the component carrier notified by the Msg2. At this time, in the case where the component carrier notified by the Msg2 is set as the "Configured but Deactivated CC" (de-active state), the control unit 14 changes it into the "Configured and Activated CC" (active state).

(Step S319) The radio communication unit 11 transmits the Msg4 to the mobile station 20 by using the component carrier in which the Msg3 is received. The radio communication unit 11 then performs data communication by using the component carrier in which the Msg3 and the Msg4 are transmitted and received.

Figure 28:
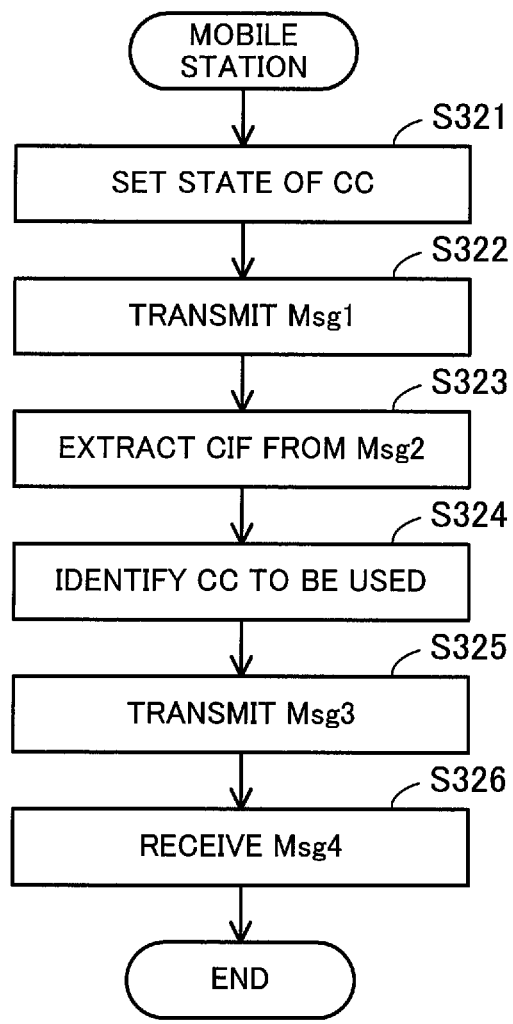
FIG. 28 is a flowchart illustrating a process of a mobile station according to a fourth embodiment.

FIG. 28 is a flowchart illustrating a process of the mobile station according to the fourth embodiment. The process illustrated in FIG. 28 includes the following steps:

(Step S321) The control unit 23 sets states of the CC#1 to #5. Specifically, the control unit 23 identifies the "Configured but Deactivated CC", the "Configured and Activated CC", and the "PDCCH monitoring set". The radio communication unit 21 monitors the PDCCH of the component carrier included in the "PDCCH monitoring set".

(Step S322) The radio communication unit 21 transmits the Msg1 using the randomly selected signal sequence to the base station 10 by using the PRACH of the component carrier included in the "PDCCH monitoring set".

(Step S323) The radio communication unit 21 receives the Msg2 from the base station 10 by using the component carrier in which the Msg1 is transmitted. The RAR control unit 27 extracts the CIF included in the Msg2. In the case where the plurality of the Msg2 sets are received, the RAR control unit 27 extracts the CIF for each Msg2.

(Step S324) The RAR control unit 27 identifies one or the plurality of the component carriers indicated by the CIF extracted at step S323. In the case where the component carrier indicated by the CIF is set as the "Configured but Deactivated CC", the RAR control unit 27 changes it into the "Configured and Activated CC". The cross carrier setting unit 22 sets a frequency band for performing signal processing.

(Step S325) The radio communication unit 21 transmits the Msg3 to the base station 10 by using the component carrier indicated by the CIF. In the case where the plurality of the Msg2 sets are received and the plurality of the component carriers are identified at step S324, the radio communication unit 21 transmits the Msg3 to the base station 10 for each of the identified component carriers. The plurality of the Msg3 sets may be transmitted at the same timing, or at different timing.

(Step S326) The radio communication unit 21 receives the Msg4 from the base station 10 by using the component carrier in which the Msg3 is transmitted. The radio communication unit 21 then performs data communication by using the component carrier in which the Msg3 and the Msg4 are transmitted and received.

Figure 29:
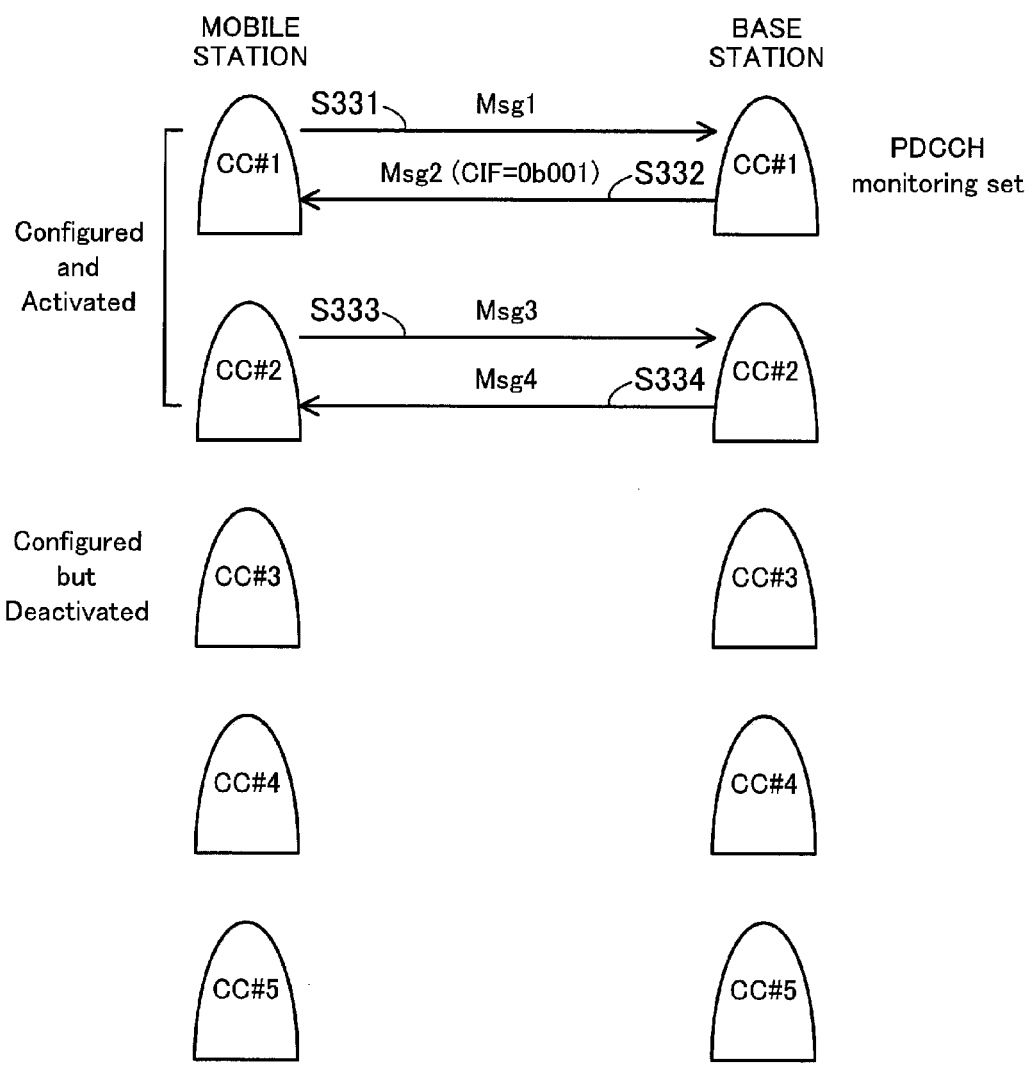
FIG. 29 illustrates a first random access example according to a fourth embodiment.

FIG. 29 illustrates a first random access example according to the fourth embodiment. Suppose here that the mobile station 20 sets CC#1 and #2 as the "Configured and Activated CC" and the CC#3 to #5 as the "Configured but Deactivated CC". Suppose further that the "PDCCH monitoring set" includes only the CC#1.

(Step S331) The mobile station 20 transmits the Msg1 using the randomly selected signal sequence to the base station by using the CC#1 set as the "PDCCH monitoring set".

(Step S332) The base station 10 transmits the Msg2 including the CIF=0b001 to the mobile station 20 by using the CC#1 in which the Msg1 is received.

(Step S333) The mobile station 20 transmits the Msg3 to the base station 10 by using the CC#2 indicated by the CIF=0b001.

(Step S334) The base station 10 transmits the Msg4 to the mobile station 20 by using the CC#2 in which the Msg3 is received. By using the CC#2, for example, the mobile station 20 then transmits data to the base station 10. Note that in the case where contention of the random access occurs, the mobile station 20 transmits the Msg1 to the base station 10 again.

Figure 30:
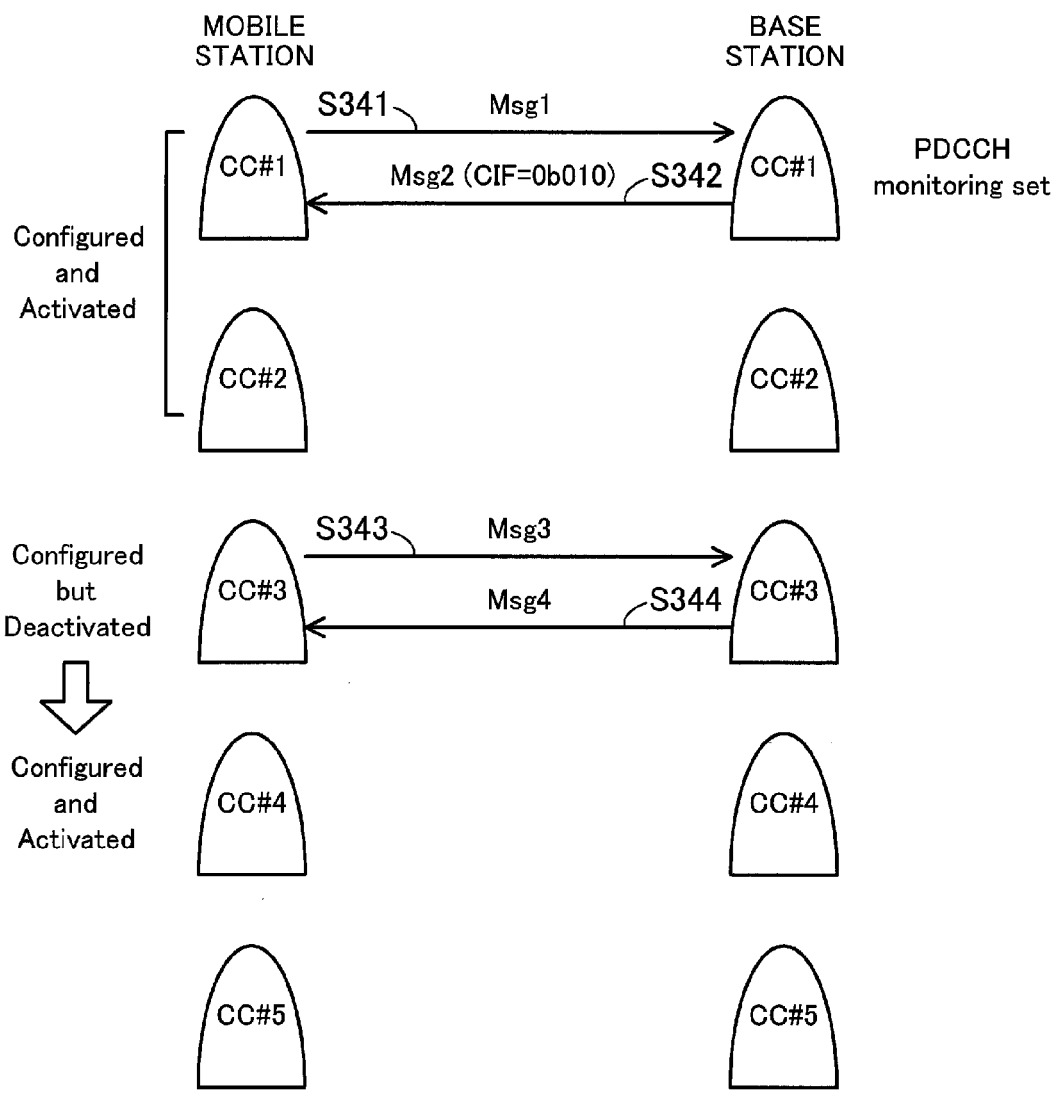
FIG. 30 illustrates a second random access example according to a fourth embodiment.

FIG. 30 illustrates a second random access example according to the fourth embodiment. States of the CC#1 to #5 at the time of starting the random access procedure are the same as those of FIG. 29.

(Step S341) The mobile station 20 transmits the Msg1 using the randomly selected signal sequence to the base station by using the CC#1 set as the "PDCCH monitoring set".

(Step S342) The base station 10 transmits the Msg2 including the CIF=0b010 to the mobile station 20 by using the CC#1 in which the Msg1 is received. Since the CC#3 indicated by the CIF=0b010 is set as the "Configured but Deactivated CC", the base station 10 activates the CC#3 and changes it into the "Configured and Activated CC".

(Step S343) The mobile station 20 transmits the Msg3 to the base station 10 by using the CC#3 indicated by the CIF=0b010. In the same manner as in the base station 10, the mobile station activates the CC#3 and changes the "Configured but Deactivated CC" into the "Configured and Activated CC".

(Step S344) The base station 10 transmits the Msg4 to the mobile station 20 by using the CC#3 in which the Msg3 is received. By using the CC#3, for example, the mobile station 20 then transmits data to the base station 10.

Figure 31:
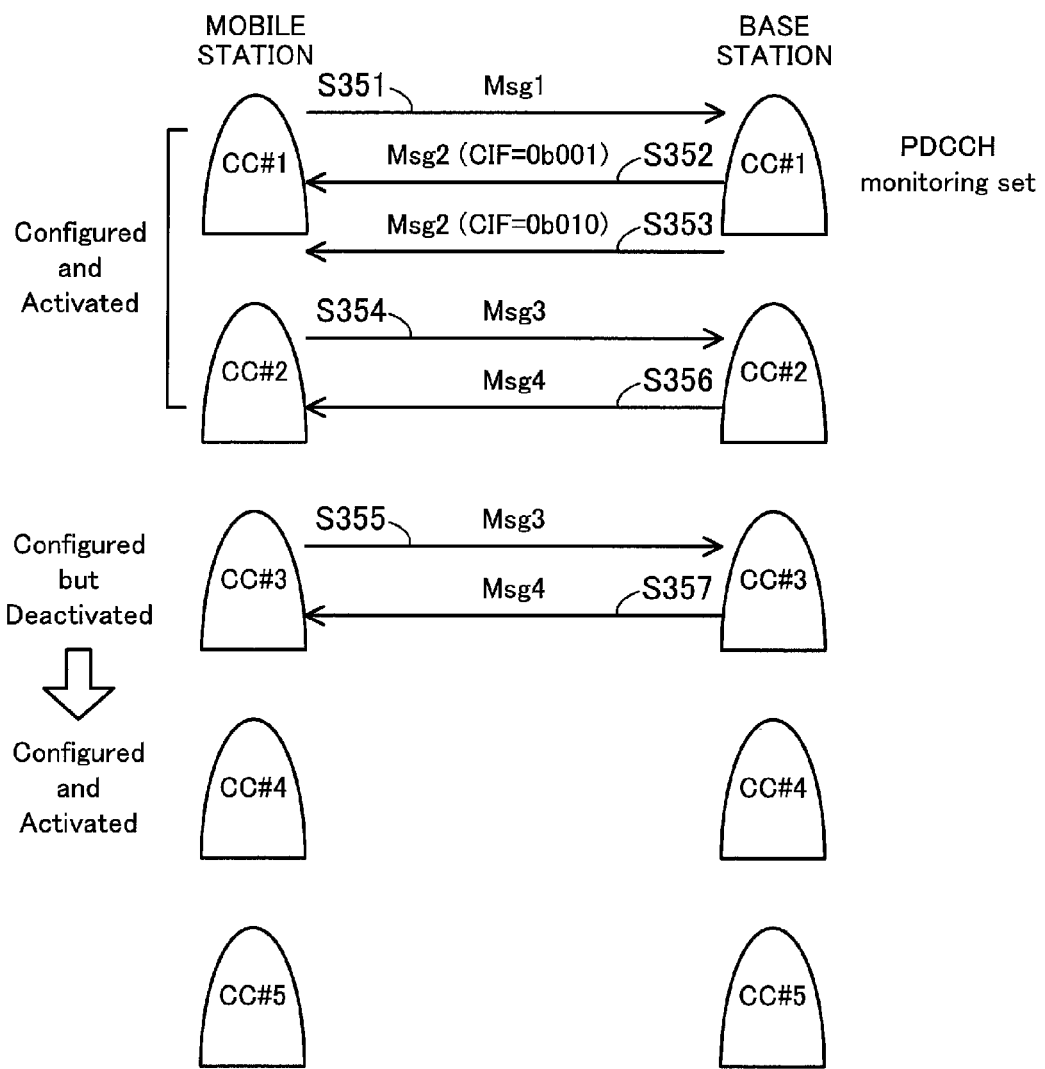
FIG. 31 illustrates a third random access example according to a fourth embodiment.

FIG. 31 illustrates a third random access example according to the fourth embodiment. States of the CC#1 to #5 at the time of starting the random access procedure are the same as those of FIG. 29.

(Step S351) The mobile station 20 transmits the Msg1 using the randomly selected signal sequence to the base station by using the CC#1 set as the "PDCCH monitoring set".

(Step S352) The base station 10 transmits the Msg2 including the CIF=0b001 to the mobile station 20 by using the CC#1 in which the Msg1 is received.

(Step S353) The base station 10 transmits the Msg2 including the CIF=0b010 to the mobile station 20 by using the CC#1 in which the Msg1 is received. Since the CC#3 indicated by the CIF=0b010 is set as the "Configured but Deactivated CC", the base station 10 activates the CC#3 and changes it into the "Configured and Activated CC".

(Step S354) The mobile station 20 transmits the Msg3 to the base station 10 by using the CC#2 indicated by the CIF=0b001.

(Step S355) The mobile station 20 transmits the Msg3 to the base station 10 by using the CC#3 indicated by the CIF=0b010. At this time, in the same manner as in the base station 10, the mobile station 20 activates the CC#3 and changes the "Configured but Deactivated CC" into the "Configured and Activated CC".

(Step S356) The base station 10 transmits the Msg4 to the mobile station 20 by using the CC#2 in which the Msg3 is received.

(Step S357) The base station 10 transmits the Msg4 to the mobile station 20 by using the CC#3 in which the Msg3 is received.

As a format of the Msg2 according to the fourth embodiment, the format example described in the third embodiment is used. In the contention based random access, since there is a possibility that the base station 10 does not recognize the mobile station 20 at the time of transmitting the Msg2, there are preferably used formats as in FIGS. 25 and 26 in which the Timing Advance Command of an absolute value is transmitted. In the fourth embodiment, from the same reason, it is preferable that the mobile station 20 may use all or the plurality of the predetermined component carriers.

Further, in the case of the contention based random access, it is also considered that the cross carrier scheduling is implemented for the purpose of a load balancing so that a plurality of mobile stations do not intensely use a specific component carrier, distributing the component carriers in which the random access procedure is performed to mitigate interference between cells, and distributing the component carriers in which the Msg3 is transmitted to reduce a contention probability.

According to the above-described mobile communication system of the fourth embodiment, the base station 10 implements the cross carrier scheduling by using the Msg2 in the same manner as in the third embodiment. Accordingly, a procedure of permission for the usage of the component carrier need not be separately performed. Along with the transmission and reception of the Msg2 and the Msg3, the base station 10 and the mobile station 20 further change the component carrier in a de-active state into that in an activate state. Therefore, a procedure of the state change of the component carrier need not be separately performed. As can be seen from the above discussion, the base station 10 and the mobile station 20 effectively perform use control of the plurality of the component carriers in the same manner as in the second and third embodiments.

According to the above-described radio communication apparatus, radio communication system, and radio communication method, use control of a plurality of frequency bands is effectively performed.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A radio communication apparatus to perform communication with another radio communication apparatus by using a plurality of frequency bands, the apparatus comprising:
    a receiving unit configured to receive by using a first frequency band a control message including identification information indicating a second frequency band different from the first frequency band during a random access procedure to said another radio communication apparatus; and
    a control unit configured to control data communication between said another radio communication apparatus and the radio communication apparatus by using the second frequency band indicated by the identification information included in the control message, wherein:
    the receiving unit is configured to receive by using the first frequency band another control message including other identification information indicating a third frequency band different from the first and second frequency bands during a random access procedure to said another radio communication apparatus; and
    the control unit is configured to control data communication between said another radio communication apparatus and the radio communication apparatus by using the third frequency band indicated by the other identification information included in said another control message.

2. The radio communication apparatus according to claim 1, wherein the control message is a message relating to a signal sequence that is used for a preamble message to be transmitted from the radio communication apparatus to said another radio communication apparatus.

3. The radio communication apparatus according to claim 2, wherein the control unit controls the radio communication apparatus to transmit the preamble message, based on the control message, to said another radio communication apparatus by using the second frequency band.

4. The radio communication apparatus according to claim 1, wherein the control message is a response message received from said another radio communication apparatus in response to a preamble message transmitted by the radio communication apparatus.

5. The radio communication apparatus according to claim 4, wherein:

the control message being the response message further includes timing adjustment information on the second frequency band; and
    the control unit controls timing of the data communication using the second frequency band based on the timing adjustment information included in the control message.

6. The radio communication apparatus according to claim 1, wherein, upon reception of the control message while the second frequency band is in a de active state, the control unit changes a state of the second frequency band into an active state.

7. A radio communication apparatus to perform communication with another radio communication apparatus by using a plurality of frequency bands, the apparatus comprising:
    a control unit configured to select a second frequency band different from a first frequency band as a frequency band used for data communication by said another radio communication apparatus; and
    a transmitting unit configured to transmit a control message including identification information indicating the second frequency band to said another radio communication apparatus by using the first frequency band during a random access procedure, wherein:
    the control unit is configured to select a third frequency band different from the first and second frequency bands as a frequency band used for the data communication by said another radio communication apparatus; and
    the transmitting unit is configured to transmit another control message including other identification information indicating the third frequency band to said another radio communication apparatus by using the first frequency band during a random access procedure.

8. A radio communication system to perform communication by using a plurality of frequency bands, the system comprising:
    a first radio communication apparatus configured to transmit by using a first frequency band a control message including identification information indicating a second frequency band different from the first frequency band during a random access procedure, and transmit by using the first frequency band another control message including other identification information indicating a third frequency band different from the first and second frequency bands; and
    a second radio communication apparatus configured to receive the control message from the first radio communication apparatus by using the first frequency band, receive said another control message from the first radio communication apparatus by using the first frequency band, and perform data communication by using the second frequency band indicated by the identification information included in the control message and the third frequency band indicated by the other identification information included in said another control message.

9. A radio communication method for use in a radio communication system including first and second radio communication apparatus to perform communication by using a plurality of frequency bands, the method comprising:
    transmitting, by the first radio communication apparatus, a control message including identification information indicating a second frequency band different from a first frequency band to the second radio communication apparatus by using the first frequency band during a random access procedure performed by the second radio communication apparatus;

receiving, by the second radio communication apparatus, the control message from the first radio communication apparatus by using the first frequency band;

performing, by the second radio communication apparatus, data communication by using the second frequency band indicated by the identification information included in the control message;

transmitting, by the first radio communication apparatus, another control message including other identification information indicating a third frequency band different from the first and second frequency bands to the second radio communication apparatus by using the first frequency band during a random access procedure performed by the second radio communication apparatus;

receiving, by the second radio communication apparatus, said another control message from the first radio communication apparatus by using the first frequency band; and performing, by the second radio communication apparatus, data communication by using the third frequency band indicated by the other identification information included in said another control message.

* * * * *